United States Patent
Wu

(10) Patent No.: US 11,269,500 B2
(45) Date of Patent: Mar. 8, 2022

(54) METHOD AND SYSTEM FOR MODULAR WIDGETS IN SMART DEVICES

(71) Applicant: Samsung Electronics Co., Ltd., Suwon-si (KR)

(72) Inventor: Qian Wu, Overland Park, KS (US)

(73) Assignee: Samsung Electronics Co., Ltd., Suwon-si (KR)

( * ) Notice: Subject to any disclaimer, the term of this patent is extended or adjusted under 35 U.S.C. 154(b) by 102 days.

(21) Appl. No.: 15/985,429

(22) Filed: May 21, 2018

(65) Prior Publication Data
US 2019/0354266 A1   Nov. 21, 2019

(51) Int. Cl.
| | |
|---|---|
| *G06F 17/10* | (2006.01) |
| *G06F 3/04845* | (2022.01) |
| *G06F 3/04842* | (2022.01) |
| *G06F 3/0486* | (2013.01) |
| *G06F 8/70* | (2018.01) |

(52) U.S. Cl.
CPC ........ *G06F 3/04845* (2013.01); *G06F 3/0486* (2013.01); *G06F 3/04842* (2013.01); *G06F 8/70* (2013.01)

(58) Field of Classification Search
CPC ............ G06F 3/04845; G06F 3/04842; G06F 3/0486; G06F 8/70
See application file for complete search history.

(56) References Cited

U.S. PATENT DOCUMENTS

| | | | |
|---|---|---|---|
| 6,317,144 B1* | 11/2001 | Pabla ............... | G06F 3/04842 715/784 |
| 8,261,231 B1* | 9/2012 | Hirsch ............... | G06F 8/30 717/100 |
| 8,519,964 B2* | 8/2013 | Platzer ............... | G06F 1/1626 345/173 |
| 8,595,186 B1* | 11/2013 | Mandyam ............ | G06F 8/38 707/632 |
| 8,635,590 B1* | 1/2014 | Ogilvie ............... | G06F 8/33 717/110 |
| 9,223,483 B2* | 12/2015 | Thorsander ......... | G06F 3/04842 |
| 9,621,428 B1* | 4/2017 | Lev .................... | H04L 41/12 |
| 9,992,440 B2* | 6/2018 | Komsi ............... | H04N 5/44591 |
| 10,747,390 B1* | 8/2020 | Ranabahu ........... | G06F 8/34 |

(Continued)

OTHER PUBLICATIONS

Yannick, Our Approach to Building Modular IOS APPS, Nov. 17, 2016 (available at https://novemberfive.co/blog/modular-apps-ios/) (accessed Oct. 27, 2019) (Year: 2016).*

(Continued)

*Primary Examiner* — Shahid K Khan

(57) ABSTRACT

An electronic device, a method and computer readable medium for widget modification are disclosed. The method includes receiving a first input to modify a widget that includes at least two modules, the widget accesses resources of the electronic device. The method also includes in response to receiving the first input, separating the widget into the at least two modules. The method further includes receiving a second input to move one of the modules to a new location on a display of the electronic device. The method additionally includes in response to the second input, moving the one module to the new location on the display.

20 Claims, 11 Drawing Sheets

(56) References Cited

U.S. PATENT DOCUMENTS

| | | | |
|---|---|---|---|
| 2006/0005227 A1* | 1/2006 | Samuelsson | G06F 21/6218 726/1 |
| 2006/0015818 A1* | 1/2006 | Chaudhri | G06F 3/0482 715/779 |
| 2006/0225094 A1* | 10/2006 | Facemire | G06F 3/0486 725/45 |
| 2007/0240080 A1* | 10/2007 | Eldridge | G06F 8/34 715/835 |
| 2007/0265930 A1* | 11/2007 | Mohr | G06F 3/0481 705/26.1 |
| 2008/0034318 A1* | 2/2008 | Louch | G06F 3/0486 715/781 |
| 2008/0235602 A1* | 9/2008 | Strauss | G06F 9/451 715/762 |
| 2009/0064106 A1* | 3/2009 | Webster | G06F 8/36 717/120 |
| 2009/0180644 A1* | 7/2009 | Jiang | H04R 3/00 381/120 |
| 2009/0217177 A1* | 8/2009 | DeGrazia | H04L 51/046 715/753 |
| 2009/0217187 A1* | 8/2009 | Kendall | G06T 3/00 715/765 |
| 2009/0222884 A1* | 9/2009 | Shaji | H04L 41/0893 726/1 |
| 2009/0249359 A1* | 10/2009 | Caunter | G06F 9/44505 719/315 |
| 2010/0125806 A1* | 5/2010 | Igeta | G06F 3/0486 715/770 |
| 2011/0074710 A1 | 3/2011 | Weeldreyer et al. | |
| 2012/0005577 A1* | 1/2012 | Chakra | G06F 8/38 715/702 |
| 2012/0084689 A1* | 4/2012 | Ledet | G06F 3/0486 715/769 |
| 2012/0266079 A1 | 10/2012 | Lee et al. | |
| 2012/0311501 A1* | 12/2012 | Nonez | G06F 3/04817 715/838 |
| 2013/0275901 A1* | 10/2013 | Saas | G06F 3/04812 715/769 |
| 2014/0189592 A1* | 7/2014 | Benchenaa | G06F 3/04886 715/835 |
| 2014/0223313 A1* | 8/2014 | Aebi | G06F 3/0488 715/733 |
| 2014/0298253 A1* | 10/2014 | Jin | G06F 3/04883 715/790 |
| 2015/0242076 A1* | 8/2015 | Jo | G06F 3/0482 715/765 |
| 2015/0277673 A1* | 10/2015 | Ye | G06F 3/04886 715/800 |
| 2015/0309849 A1* | 10/2015 | Lau | G06F 9/468 715/835 |
| 2016/0117072 A1* | 4/2016 | Sharifi | G06F 3/04842 715/769 |
| 2016/0350730 A1* | 12/2016 | Greenberg | G06Q 50/01 |
| 2017/0262140 A1* | 9/2017 | Dimitropoulos | G06F 3/04817 |

OTHER PUBLICATIONS

Mangin, Alexis, Why React developers should modularize their applications? Feb. 15, 2018 (available at https://medium.com/@alexmngn/why-react-developers-should-modularize-their-applications-d26d381854c1) (accessed Oct. 27, 2019) (Year: 2018).*

Herbster, Raul et al. "Privacy Capsules: Preventing Information Leaks by Mobile Apps." Proceedings of the 14th Annual International Conference on Mobile Systems, Applications, and Services (2016): pp. 399-411 (Year: 2016).*

"Editor Widgets", dated Mar. 8, 2018, 3 pages. https://play.google.com/store/apps/details?id=com.round.widgeteditor&hl=en.

* cited by examiner

METHOD AND SYSTEM FOR MODULAR WIDGETS IN SMART DEVICES

TECHNICAL FIELD

This disclosure relates generally to user interfaces on electronic devices. More specifically, this disclosure relates to a method and system for creating modular widgets on an electronic device.

BACKGROUND

Electronic devices with a graphical user interface (GUI) such as personal digital assistants (PDA), smart phones, personal computers, wearable devices, virtual reality headsets, and the like, have increased in years, due to user demand and recent technological developments. One result of the recent technological developments is that electronic devices are becoming more compact, while the number of functions performed by a given device increases. With the rise of mobile computing technology, many program applications designed specifically for use on a mobile device are being developed. Many of the applications include widgets that can be located on the display and provide information to a user or allow a user to user interact with a particular application without requiring the user to open or access the respective application.

SUMMARY

This disclosure provides method and system for modular widgets in smart devices.

In a first embodiment, an electronic device for widget modification is provided. The electronic device includes a display and a processor operably coupled to the display. The display is configured to display a widget. The processor is also configured to receive a first input to modify a widget that includes at least two modules, the widget accesses resources of the electronic device. The processor is further configured to in response to receiving the first input, separate the widget into the at least two modules. The processor is additionally configured to receive a second input to move one of the modules to a new location on the display of the electronic device. The processor is also configured to in response to the second input, move the one module to the new location on the display.

In another embodiment, a method for widget modification is provided. The method includes receiving a first input to modify a widget that includes at least two modules, the widget accesses resources of the electronic device. The method further includes in response to receiving the first input, separating the widget into the at least two modules. The method additionally includes receiving a second input to move one of the modules to a new location on a display of the electronic device. The method also includes in response to the second input, moving the one module to the new location on the display.

In a third embodiment, a non-transitory computer readable medium embodying a computer program is provided. The computer program includes computer readable program code that when executed by a processor of an electronic device causes processor to receive a first input to modify a widget that includes at least two modules, the widget accesses resources of the electronic device; in response to receiving the first input, separate the widget into the at least two modules; receive a second input to move one of the modules to a new location on the display of the electronic device; and in response to receiving the second input, move the one module to the new location on the display.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
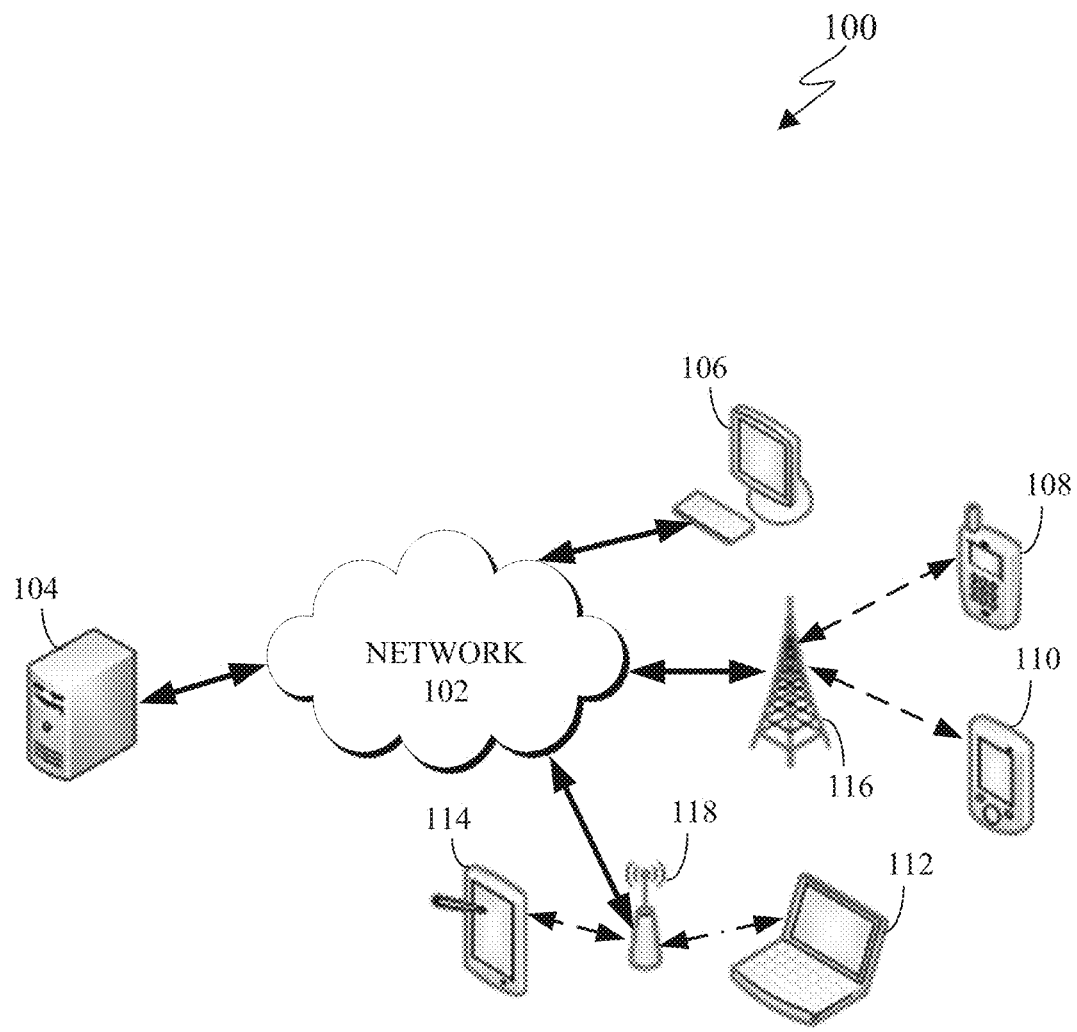
FIG. 1 illustrates an example communication system in accordance with embodiments of the present disclosure.

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

Various programs and applications associated with mobile computing and electronic devices are designed specifically for tablets, personal computers, smart phones and the like. For example, an application is a program that runs on an electronic device. Many types of applications can include a widget that provides a condensed version of the application. A widget is a simple application extension that is often part of a larger application that is already installed on the electronic device. A widget for an application can often display one or more pieces of information via a user interface and provide quick access to particular functionalities of the main application to a user.

Widgets come in all shapes and sizes. If the electronic device includes multiple screens, a widget can reside on any available screens for quick access. Additionally, a widget can also be a standalone program separate from any applications on the electronic device.

In certain embodiments, a widget is a self-contained mini-program that runs on the display screen of an electronic device. In certain embodiments, a widget is a shortcut for launching an application, such as an icon that is typically used for lunching an application. In certain embodiments, a widget is larger than a shortcut for launching an application as it displays particular information and data to a user and can interactive.

In certain embodiments, a widget can range in size from a single icon-like item displayed to a user, to a full page display that can provide information or a user interface or both. For example, a widget can be a shortcut similar to an icon that direct a user various functionalities of the device itself, such as a WI-FI widget that opens the WI-FI settings of the electronic device. In another example, a weather widget can display details of the weather that updates as needed. For instance, a weather widget can display to a user the current temperature, an indication as to the condition (such as whether it is sunny, raining, foggy, and the like), extended forecasting, radar, and the like.

Some widgets provide quick access to information without requiring a user to open a particular application or program that manages the information. An example is the Calendar widget, provides users with a quick view of your upcoming calendar events without opening the calendar application. A mail widget functions similarly, as it displays emails in a user's email inbox without requiring a user to open the particular mail application. In another example, a weather widget simply displays various metrological weather data that updates at various intervals and does not require a user to open the weather program. Other widgets provide various methods for a user to interact with the electronic device. For example, a widget can turn on or off a light, such as a flashlight, associated with the electronic device. In another example, the widget can open a particular application for a user, similar to a shortcut icon.

Widgets usually fall into a particular category, such as an information widget, a collection widget, a control widget, a hybrid widget, and the like. An information widget typically displays informational elements that are important to a user and can track how that information changes over time. For example, information widgets can include weather widgets, clock widgets, sports trackers, news trackers, stock trackers, step counters, email, schedules/calendar entries, and the like. A collection widget collects and displays the collected information to a user. For example, collection widgets can collect pictures from a picture folder, particular news articles of a subject matter that the user previously indicated was of interest, emails and messages from one or more communication applications, and the like. A control widget displays often-used functions that a user can easily trigger without having to access a menu or a program to execute the desired adjustments. For example, music widget is a control widget that allows the user to play, pause, or skip music tracks from outside the actual music application. In another example, a control widget can turn on or off a flashlight function, or various connection functions, such as WI-FI, BLUETOOTH, Near Field Communication (NFC), and the like. A hybrid widget is a combination of two or three of the aforementioned widgets. For example, a music widget that displays information about the audio as well as provides control functionality of the audio is considered a hybrid widget as the widget includes both information and control aspects.

In certain embodiments, widgets that are related to applications can save resources of the electronic device, such as various battery draining features, and reduce processing requirements. For example, a widget can use fewer processing requirements than a full application, as less processing is necessary is often less for a widget than the associated application, the data received or sent through the network is often less for a widget than the associated application, the display requirements for the widget are often less than the display requirements for the associated application, and the like. However, running multiple widgets that constantly use various sensors or communicate via the internet can also drain and waste resources unnecessarily, especially if two or more widgets perform similar or overlapping functions. For example, certain functionalities of particular widgets can overlap, such as when multiple widgets display the same or similar information. For example, two separate widgets can display the time, can display recently received messages and the like. In another example, two separate widgets can provide similar information such as one widget can display approximate time to travel to a location while another widget displays the traffic. In another example, one widget can display nearby stores such as restaurants, shopping centers, bars, gyms, and the like, while another widget displays only nearby restaurants. Having multiple widgets each communicating with the internet and accessing various resources to indicate the same or similar information needlessly wastes resources of the electronic device.

Embodiments of the present disclosure provide an electronic device and methods for widget modification, thereby allowing a user to select particular portions of a widget to maintain and discard other aspects of a widget in order to create a custom or modified widget. The custom widget can include functionalities that the user selects. For example, a user can select features or portions of one or more widgets and discard other portions of a widget in order to reduce disorder of multiple widgets on the display screen of the electronic device. Similarly, by selecting portions of a widget to maintain and other portions of a widget to discard, allows a user to indicate particular resources that the widget can access as well as particular resources that the user does not want the widget to access. For example, if a widget displays both traffic and weather to a user, if the user selects the weather portion and discards the traffic portion of the widget, then the traffic portion does not commutate with the internet and thereby unnecessarily drains resources of the electronic device. As such, embodiments of the present disclosure allow a user to select portions of a widget to remain on the display and other portions to remove from the display.

Embodiments of the present disclosure provide an electronic device and methods for combining two or more modular portions of a widget to create a new widget. In certain embodiments, a user can combine two or more modular portions of one or more different widgets to create a custom modified widget. For example, if a widget has four modules and the user wants a to keep two or the four modules, the user can create a new widget that includes the portions of the widget as indicated by the user. In another example, if a first widget denoted as 'widget A' has three modules and a second widget denoted as 'widget B' has two modules, a module from widget A can be moved to widget B. Similarly, a module form widget A and a module from widget B can be combined to create a new widget C.

FIG. 1 illustrates an example computing system 100 according to this disclosure. The embodiment of the system 100 shown in FIG. 1 is for illustration only. Other embodiments of the system 100 can be used without departing from the scope of this disclosure.

The system 100 includes network 102 that facilitates communication between various components in the system 100. For example, network 102 can communicate Internet Protocol (IP) packets, frame relay frames, Asynchronous Transfer Mode (ATM) cells, or other information between network addresses. The network 102 includes one or more local area networks (LANs), metropolitan area networks (MANs), wide area networks (WANs), all or a portion of a global network such as the Internet, or any other communication system or systems at one or more locations.

The network 102 facilitates communications between a server 104 and various client devices 106-114. The client devices 106-114 may be, for example, a smartphone, a tablet computer, a laptop, a personal computer, or a wearable device. The server 104 can represent one or more servers. Each server 104 includes any suitable computing or processing device that can provide computing services for one or more client devices. Each server 104 could, for example, include one or more processing devices, one or more memories storing instructions and data, and one or more network interfaces facilitating communication over the network 102.

Each client device 106-114 represents any suitable computing or processing device that interacts with at least one server or other computing device(s) over the network 102. In this example, the client devices 106-114 include a desktop computer 106, a mobile telephone or mobile phone 108 (such as a smartphone), a personal digital assistant (PDA) 110, a laptop computer 112, and a tablet computer 114. However, any other or additional client devices could be used in the system 100. As described in more detail below, any client device 106-114 can include the widget modification techniques described herein.

In this example, some client devices 108-114 communicate indirectly with the network 102. For example, the client devices 108 and 110 (mobile phone 108 and PDA 110, respectively) communicate via one or more base stations 116, such as cellular base stations or eNodeBs (eNBs). Also, the client devices 112 and 114 (laptop computer 112 and tablet computer 114, respectively) communicate via one or more wireless access points 118, such as IEEE 802.11 wireless access points. Note that these are for illustration only and that each client device 106-114 could communicate directly with the network 102 or indirectly with the network 102 via any suitable intermediate device(s) or network(s). In certain embodiments, the mobile phone 108 (or any other client device 106-114) transmits information securely and efficiently to another device, such as, for example, the server 104.

Although FIG. 1 illustrates one example of a system 100, various changes can be made to FIG. 1. For example, the system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

The processes and systems provided in this disclosure allow for widget modification to be performed on a GUI of an electronic device. For example, when an electronic device that includes a GUI utilizes widgets as a form of program running on the electronic device, each widget can be modified and customized based on the inputs received by the user. By customizing a particular widget, any modular portion of the widget that is deactivated results in deactivating the respective recourses utilized by that particular module. For example, if a displayed widget is connected with multiple separate servers, such as server 104, and a module of the widget, that is connected to one of the servers and is the only module connected to that specific server, is removed from the display, the resources of the electronic device that are used to support the communication between that module and the respective server are no longer utilized and resources are preserved or reallocated.

Figure 2:
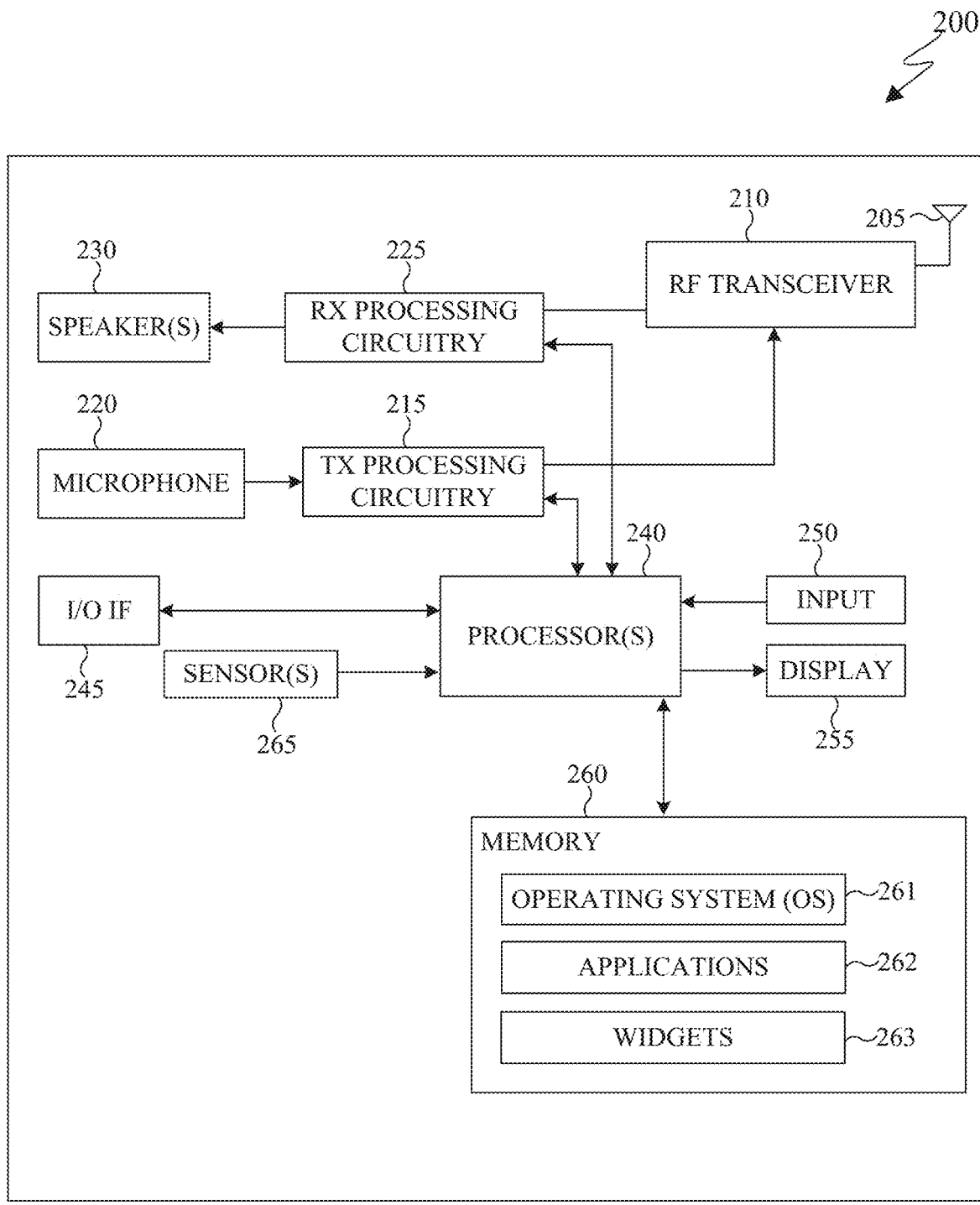
FIG. 2 illustrates an example electronic device in accordance with an embodiment of this disclosure.

FIG. 2 illustrates an electronic device in accordance with an embodiment of this disclosure. The embodiment of the electronic device 200 shown in FIG. 2 is for illustration only and other embodiments can be used without departing from the scope of this disclosure. The electronic device 200 can come in a wide variety of configurations, and FIG. 2 does not limit the scope of this disclosure to any particular implementation of an electronic device. In certain embodiments, the server 104 and one or more of the client devices 106-114 of FIG. 1 can include the same or similar configuration as electronic device 200.

In certain embodiments, the electronic device 200 is a smart phone similar to mobile phone 108 and includes a GUI that includes at least one widget displayed to a user. In certain embodiments, the electronic device 200 is a computer (similar to the desktop computer 106 of FIG. 1), mobile device (similar to mobile phone 108 of FIG. 1), a PDA (similar to the PDA 110 of FIG. 1), a laptop (similar to laptop computer 112 of FIG. 1), a tablet (similar to the tablet computer 114 of FIG. 1), a wearable device, and the like. In certain embodiments, electronic device 200 detects when a user input indicates a widget modification. In certain embodiments, electronic device 200 performs a widget modification by modularizing a widget to modify an existing widget, create a new widget, or both.

As shown in FIG. 2, the electronic device 200 includes an antenna 205, a radio frequency (RF) transceiver 210, transmit (TX) processing circuitry 215, a microphone 220, and receive (RX) processing circuitry 225. In certain embodiments, the RF transceiver 210 is a general communication interface and can include, for example, a RF transceiver, a BLUETOOTH transceiver, a WI-FI transceiver, ZIGBEE, infrared, and the like. The electronic device 200 also includes speaker(s) 230, processor(s) 240, an input/output (I/O) interface (IF) 245, an input 250, a display 255, a memory 260, and sensor(s) 265. The memory 260 includes an operating system (OS) 261, one or more applications 262, and widgets 263. The memory 260 can include a voice recognition dictionary containing learned words and commands.

The RF transceiver 210 receives, from the antenna 205, an incoming RF signal such as a BLUETOOTH or WI-FI signal from an access point (such as a base station, WI-FI router, BLUETOOTH device, or any other type of access point) of a network (such as WI-FI, BLUETOOTH, cellular, 5G, LTE, LTE-A, WiMAX, or any other type of wireless network). The RF transceiver 210 down-converts the incoming RF signal to generate an intermediate frequency or baseband signal. The intermediate frequency or baseband signal is sent to the RX processing circuitry 225 that generates a processed baseband signal by filtering, decoding, or digitizing, or a combination thereof, the baseband or intermediate frequency signal. The RX processing circuitry 225 transmits the processed baseband signal to the speaker(s) 230, such as for voice data, or to the processor 240 for further processing, such as for web browsing data or image processing, or both. In certain embodiments, speaker(s) 230 includes one or more speakers.

The TX processing circuitry 215 receives analog or digital voice data from the microphone 220 or other outgoing baseband data from the processor 240. The outgoing baseband data can include web data, e-mail, or interactive video game data. The TX processing circuitry 215 encodes, multiplexes, digitizes, or a combination thereof, the outgoing baseband data to generate a processed baseband or intermediate frequency signal. The RF transceiver 210 receives the outgoing processed baseband or intermediate frequency signal from the TX processing circuitry 215 and up-converts the baseband or intermediate frequency signal to an RF signal that is transmitted via the antenna 205.

The processor 240 can include one or more processors or other processing devices and execute the OS 261 stored in the memory 260 in order to control the overall operation of the electronic device 200. For example, the processor 240 can control the reception of forward channel signals and the transmission of reverse channel signals by the RF transceiver 210, the RX processing circuitry 225, and the TX processing circuitry 215 in accordance with well-known principles. The processor 240 is also capable of executing other applications 262 residing in the memory 260, such as, one or more applications for modifying a widget. The processor 240 can include any suitable number(s) and type(s) of processors or other devices in any suitable arrangement. For example, the processor 240 is capable of natural language processing, voice recognition processing, object recognition processing, eye tracking processing, and the like. In some embodiments, the processor 240 includes at least one microprocessor or microcontroller. Example types of processor 240 include microprocessors, microcontrollers, digital signal processors, field programmable gate arrays, application specific integrated circuits, and discreet circuitry.

The processor 240 is also capable of executing other processes and programs resident in the memory 260, such as operations that receive, store, and timely instruct by providing voice and image capturing and processing. The processor 240 can move data into or out of the memory 260 as required by an executing process. In some embodiments, the processor 240 is configured to execute a plurality of applications 262 based on the OS 261 or in response to signals received from eNBs or an operator.

The processor 240 is also coupled to the I/O interface 245 that provides the electronic device 200 with the ability to connect to other devices such as the client devices 106-114. The I/O interface 245 is the communication path between these accessories and the processor 240

The processor 240 is also coupled to the input 250 and the display 255. The operator of the electronic device 200 can use the input 250 to enter data or inputs, or a combination thereof, into the electronic device 200. Input 250 can be a keyboard, touch screen, mouse, track ball or other device capable of acting as a user interface to allow a user in interact with electronic device 200. For example, the input 250 can include a touch panel, a (digital) pen sensor, a key, an ultrasonic input device, or an inertial motion sensor. The touch panel can recognize, for example, a touch input in at least one scheme along with a capacitive scheme, a pressure sensitive scheme, an infrared scheme, or an ultrasonic scheme. In the capacitive scheme, the input 250 is able to recognize a touch or proximity. Input 250 can be associated with sensor(s) 265, a camera, or a microphone, such as or similar to microphone 220, by providing additional input to processor 240. In certain embodiments, sensor 265 includes inertial sensors (such as, accelerometers, gyroscope, and magnetometer), optical sensors, motion sensors, cameras, pressure sensors, heart rate sensors, altimeter, and the like. The input 250 also can include a control circuit.

The display 255 can be a liquid crystal display, light-emitting diode (LED) display, organic LED (OLED), active matrix OLED (AMOLED), or other display capable of rendering text and graphics, such as from websites, videos, games and images, and the like. Display 255 can be sized to fit within a HMD. Display 255 can be a singular display screen or multiple display screens for stereoscopic display. In certain embodiments, display 255 is a heads up display (HUD).

The memory 260 is coupled to the processor 240. Part of the memory 260 can include a random access memory (RAM), and another part of the memory 260 can include a Flash memory or other read-only memory (ROM).

The memory 260 can include persistent storage (not shown) that represents any structure(s) capable of storing and facilitating retrieval of information (such as data, program code, or other suitable information on a temporary or permanent basis). The memory 260 can contain one or more components or devices supporting longer-term storage of data, such as a ready only memory, hard drive, flash memory, or optical disc. The memory 260 also can contain widgets 263. Widgets 263 include one or more widgets that are capable of being modified. Widgets that are capable of being modified include modules that are capable of being separated from original widget and are capable of being combined with another module or widget.

Electronic device 200 further includes one or more sensor(s) 265 that are able to meter a physical quantity or detect an activation state of the electronic device 200 and convert metered or detected information into an electrical signal. In certain embodiments, sensor 265 includes inertial sensors (such as accelerometers, gyroscopes, and magnetometers), optical sensors, motion sensors, cameras, pressure sensors, heart rate sensors, altimeter, breath sensors (such as microphone 220), and the like. For example, sensor(s) 265 can include one or more buttons for touch input (such as on the headset or the electronic device 200), a camera, a gesture sensor, a gyroscope or gyro sensor, an air pressure sensor, a magnetic sensor or magnetometer, an acceleration sensor or accelerometer, a grip sensor, a proximity sensor, a color sensor, a bio-physical sensor, a temperature/humidity sensor, an illumination sensor, an Ultra-violet (UV) sensor, an Electromyography (EMG) sensor, an Electroencephalogram (EEG) sensor, an Electrocardiogram (ECG) sensor, an Infrared (IR) sensor, an ultrasound sensor, an iris sensor, a fingerprint sensor, and the like. The sensor(s) 265 can further include a control circuit for controlling at least one of the sensors included therein. The sensor(s) 265 can be used to determine an orientation and facing direction, as well as geographic location of the electronic device 200. Any of these sensor(s) 265 can be disposed within the electronic device 200.

Although FIG. 2 illustrates one example of electronic device 200, various changes can be made to FIG. 2. For example, various components in FIG. 2 can be combined, further subdivided, or omitted and additional components can be added according to particular needs. As a particular example, the processor 240 can be divided into multiple processors, such as one or more central processing units (CPUs), one or more graphics processing units (GPUs), one or more an eye tracking processors, and the like. Also, while FIG. 2 illustrates the electronic device 200 configured as a mobile telephone, tablet, or smartphone, the electronic device 200 can be configured to operate as other types of mobile or stationary devices.

Figure 3:
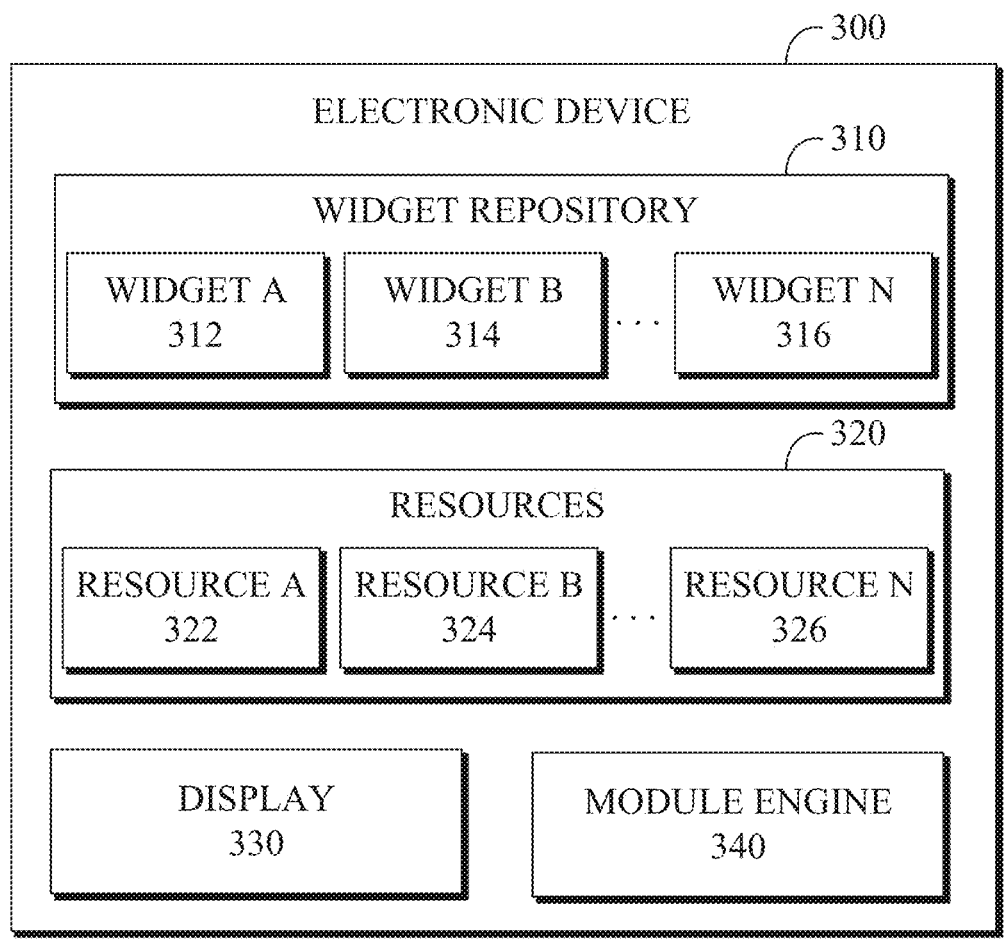
FIG. 3 illustrates an example block diagram of an electronic device with a GUI in accordance with an embodiment of this disclosure.

FIG. 3 illustrates an example block diagram of an electronic device with a GUI in accordance with an embodiment of this disclosure. The embodiment of the electronic device shown in FIG. 3 is for illustration only. Other embodiments can be used without departing from the scope of the present disclosure.

Electronic device 300 illustrates a high-level overview of an embodiment of the present disclosure. Electronic device 300 can modify widgets displayed on a display of the electronic device 300 by modularizing the displayed widgets into widget modules. Electronic device 300 can be configured similar to any of the one or more client devices 106-114 of FIG. 1, and can include internal components similar to that of electronic device 200 of FIG. 2. In certain embodiments, the electronic device 300 is similar to a smart phone (similar to the mobile phone 108 of FIG. 1), a head mounted display, a wearable device, a desktop computer (similar to the desktop computer 106 of FIG. 1), a laptop computer (similar to the laptop computer 112 of FIG. 1), a tablet computer (similar to the tablet computer 114 of FIG. 1), and the like. Additional examples of the electronic device 300 includes a cellular phone, a PDA (similar to the PDA 110 of FIG. 1), an image sensing device such as a digital camera, a gaming device, a music storage and playback device, a household appliance capable of wireless Internet access and web browsing, and a portable unit or terminal integrating the functions of the aforementioned items. The electronic device 300 includes a widget repository 310, resources 320, a display 330, and a module engine 340.

In certain embodiments, electronic device 300 is connected to one or more servers to download and receive widgets. For example, electronic device 300 can include components to allow the electronic device 300 to access one or more networks. Electronic device 300 can access networks in order to acquire widgets from one or more widget manufacturers or developers. The network can be similar to network 102 of FIG. 1. The network can be personal area network (PAN), Local Area Networks (LANs), Wireless Local Area Networks (WLANs), the Internet, the Public Switched Telephone Network (PSTN), as well as other wireless networks. The network may also be the Internet representing a worldwide collection of networks and gateways that use Transmission Control Protocol/Internet Protocol (TCP/IP) protocols to communicate with one another. The network can include a cable, a router, switches a firewall, or a combination thereof. The network can include a variety of connections, such as, wired, wireless or fiber optic connections.

Widget manufacturers or developers develop widgets that can be used on the electronic device 300. In certain embodiments, the electronic device 300 includes a widget repository 310 that is a repository of one or more widgets. Widget repository 310 can be similar to memory 260 of FIG. 2. In certain embodiments, widget repository 310 is similar to widgets 263 of FIG. 2. Widget repository 310 can store widgets received from one or more widget manufacturers or developers. In certain embodiments, widget repository includes widgets that are developed for widget modification as well as widgets that are developed not to be modified. For example, widget repository 310 can be subdivided into two components, where a first component includes widgets that are developed for widget modification and a second component that includes widgets that are developed not to be modified. Widget repository 310 can include any number of widgets such as widget A 312, widget B 314 through widget N 316. It is noted that widget repository can include only widget A 312, only widget A 312 and widget B 314, or any number of widgets as such as widget A 312 through widget N 316.

Widget A 312, widget B 314, through widget N 316 (collectively widgets A-N 312-316) can be any type of widget, such as an information widget, a collection widget, a control widget, a hybrid widget, and the like. Each of the widgets A-N 312-316 can be trimmed down versions of an application on the electronic device 300 or stand-alone programs. In certain embodiments, the widgets A-N 312-316, provide the user of the electronic device 300 a set of application functionalities in a more compact package, thereby saving space on a display 330.

Each of the widgets A-N 312-316 can utilize one or more internal resources 320 of the electronic device 300. Similarly, the resources 320 can include any external service that the widget, application, or program accesses to provide information to the user. Resources 320 can include any number of resources such as resource A 322, resource B 324 through resource N 326. It is noted that resources 320 can include only resource A 322, only resource A 322 and resource B 324, or any number of resource as such as resource A 322 through resource N 326.

Resource A 322, resource B 324, through resource N 326 (collectively resource A-N 322-326) can be any resource that is utilized by any of the widgets associated with the electronic device 300 such as widgets A-N 312-316. In certain embodiments, any of the widgets A-N 312-316 can utilize the same resource, such as resource A 322. For example, two or more widgets can utilize the same resource. Similarly, two or more widgets can utilize separate resources as well as a combination of some individual resources and some overlapping resources.

Internal resources, for example, include processing power resources, memory, as well as accessories associated with the electronic device 300. Accessories associated with the electronic device 300 can include a camera, a light, a microphone, any sensor such as sensor 265 of FIG. 2, a communication receiver, transmitter, or transceiver, and the like.

External resources, for example, are consumed when the widget utilizes resources that are external to the electronic device. For example, one or more sensors (such as sensor 265 of FIG. 2) can be external to the electronic device. In another example, external resources can be received via a network connection to one or more servers that provides particular services. Widgets A-N 312-316 can continually receive updates through one or more servers, receive updates at predetermined intervals, receive updates when an indication is received by a user, or a combination thereof. For instance, a weather service is a resource that provides weather conditions such as temperatures, wind conditions, humidity, precipitation, cloud levels, UV levels, ozone levels, radar, weather warnings, weather alerts, and the like to a user. In another example, a hybrid resource can utilize an internal sensor such as Global Positioning System (GPS), and based on the information received an external location service is a resource that can be associated with a location of the electronic device 300 and provide traffic conditions, provide information of nearby stores restaurants and points of interest, directions to a destination, a current location, and the like to a user.

When multiple resources are utilized by one or more widgets, the performance of the electronic device 300 can be reduced. For example, processing resources, memory resources, of the electronic device are limited to the innate specifications of the electronic device. That is, as the finite number of resources are utilized by the widgets A-N 312-316, the performance of electronic device decreases as more resources are being requested than the electronic device has available. In another example, resources can also include data that is transmitted to and received from a server. Transmitting and receiving data via the electronic device also reduces the resources A-N 322-326, as the electronic device can have a limited quantity of data available for transmission. For instance, a data plan that is governed by a service provider can provide a predefined quantity of data to be transmitted or received. Similarly, the electronic device 300 can only transmit and receive a finite quantity of data during a certain period of time. As such, as the quantity of data that is transmitted or received for the widgets A-N 312-316 increases, the performance of electronic device decreases. Additionally, the more resources that are used by the widgets A-N 312-316, the more electricity is necessary to accomplish the use of each additional resource. For example, if the electronic device 300 is powered by a battery, the more resources that are utilized the quicker the electricity stored within the battery of the electronic device 300 is diminished.

The widgets A-N 312-316 can be displayed on the display 330. Each of the widgets A-N 312-316 can be interacted with by a user through a user interface. In certain embodiments, the user interface is a GUI. The input can be received from a touch screen or a user input device such as a mouse, keyboard or any other input similar to input 250 of FIG. 2. For example, when a user provides input to a widget (such as widget A 312), the widget A 312 can pass the input to the application or to the module engine 340 to execute a command as indicated by the input.

In certain embodiments, display 330 is a single display and affixed to the electronic device. Display 330 can be similar to a display screen on mobile device, or a display screen on a computer or tablet. In certain embodiments, display 330 is a display on mobile device and the mobile device (including the display) is affixed to a head mounted display. In certain embodiments, display 330 is a user interface allowing the user to provide one or more inputs with respect to the widgets A-N 312-316. By displaying a user interface on the display 330, a user is able to input particular instructions regarding the location of each widget or widget module on the display 330 as well as how to modify the widgets A-N 312-316.

Module engine 340 controls the modification of each widget such as widget A 312, widget B 314, or widget N 316, or a combination thereof. In certain embodiments, one or more of the widgets A-N 312-316 are configured to be modified by the module engine 340. The module engine 340 allows a user to define custom widgets through the display 330. For example, the module engine 340 allows a user to take a portion of the functionality of an existing widget and discard another portion of an existing widget, as well as combine a portion of an existing widget with another portion of a second existing widget. For instance, the module engine 340 allows a user to separate one or more widget into different components and reassemble a widget that is customized based on the preferences of a user. In certain embodiments, the module engine 340 is activated when a particular input is received. The module engine 340 modularizes the selected widget, such as widget A 312. Modularizing a selected widget, allows a widget to be subdivided into different individual modules, such that the selected widget (such as widget A 312) can have individual modules from another widget (such as widget B 314) added to the selected widget (such as widget A 312), have individual modules removed from the selected widget (such as widget A 312), or a combination thereof. By adding and removing modules from a widget, allows a user to create a custom widget that includes the user selected modules. In certain embodiments, module engine 340 can modularize widgets that are developed to include modules.

In certain embodiments, module engine 340 can detect or receive an input indicating that a widget is to be modified. A widget, such as widget A 312, can include two or more modules, where each module can be separated from the widget and moved to a new location on the display 330 or removed from the display, or a combination thereof. In certain embodiments, when the module engine 340 detects or receives an input indicating a widget is to be modified, the module engine 340 provides visual, auditory, or physical feedback to a user, to notify a user that the one or more widgets can be modified. For example, module engine 340 can provide a visual indication on the display 330, a sound through a speaker, haptic feedback or the like. For instance, when the module engine 340 detects or receives an input indicating a widget is to be modified, the module engine 340 can cause the individual modules of a widget to change colors, vibrate (such as move a predetermined movement up, down, left, right, and the like), change size. In another instance when the module engine 340 detects or receives an input indicating a widget is to be modified, the module engine 340 can cause the electronic device 300 to vibrate.

In certain embodiments, module engine 340 can allow a user to manually move modules of one or more widgets. For example, widget modules can be moved to a new location on the display 330. For instance, widget A 312 can include two or more modules and one of the modules can be separated from, widget A 312 and moved to new location on the display 330. In another example, a widget can receive one or more modules from another widget. For instance, widget A 312 can receive a module from widget B 314. In another example, widget A 312 can include two or more modules and one of the modules can be removed from the display 330. In another example, widget A 312 can include two or more modules and each of the modules can be reordered.

In certain embodiments, when a module is moved to a new location on the display 330, the module can be resized manually or automatically by the module engine 340. For example, a modules size can be increased or decreased. A user input can manually indicate a size a module. Similarly, module engine 340 can change the size of a module. For example, if a module is moved next to another module of that is a different size, the module engine 340 can adjust the size of the first, second, or both modules.

Module engine 340 can identify that a module of a widget is to be removed from the display. For example, module engine 340 can identify when a user input indicates that a particular module of a certain widget is to be deleted or removed from the display 330. For instance, a particular user input gesture can indicate that a module is to be removed from the display. In another instance when module engine 340 detects or receive an input indicating that a widget is to be modified, each module of a widget, such as widget A 312, can be displayed with an image that when selected by a user removes the module from the display.

Module engine 340 can also identify each resource that each module of a particular widget has access to and can utilize. That is, module engine 340 can identify which of the resources 320 (one or more resources A-N 322-326) each module of a particular widget, such as widget A 312, has access to. For example, if widget A 312 has four modules, each module can have access to one or more of the resources 320. Some of the resources 320 that that each module of widget A 312 has access to can overlap such that two or more modules can share a single resource such as resource A 322. Whereas other resources 320 that each module of widget A 312 has access to does not overlap, such that each module can have its own resource 3A-N 322-326.

In certain embodiments, module engine 340 can deactivate resources to particular modules, if the module is removed from the display. By allowing a widget (such as widget A 312) to decouple any resources 320 that are not used, such as when a module is removed from the display 330, module engine 340 preserves resources to improve the performance of the electronic device 300. For example, if widget A 312 has four modules, each module can have access to one or more of the resources 320. When one module is removed from the display, the module engine 340 deactivates any of the resources that are used by the removed module. In contrast, even when a module is removed from the display, one or more resources that are used by the removed module can remain active if at least one other module still uses a particular the resources. For example, if a module uses three resources, where each resource is shared by different modules, the resources remain active, whereas if one or more of the resources are not shared by different modules, then those resources are deactivated. In certain embodiments module engine 340 deactivates resources when no other module, widget, program, or the like of the electronic device 300 utilizes the particular resource. However, module engine 340 does not deactivate a resource if another module, widget, program, or the like of the electronic device 300 utilizes the particular resource. In certain embodiments the module engine 340 can instruct one or more modules to share a particular resource (such as one or more resources 3A-N 322-326) of the electronic device 300. In certain embodiments, a single module can be shared by two or more widgets such that the shared module can access the same resource(s).

In certain embodiments, the module engine 340 can perform an audit of the of the resources that are being used by active modules that are displayed on the display 330 or located on a different screen of the electronic device, such as multiple home screens. The audit determines if all modules of the modularized widget are being used by at least one widget. If any module is not being used then the module engine 340 can deactivate any modules that are not being used and subsequently deactivate any resources that the being used by the deactivated module. In another example the audit can identify resources that are being used by modules that are not being used by at least one widget. If any resources are being used by a module that is not being used by at least one widget, then the module engine 340 can deactivate the module from using the resource in order to preserve resources and improve battery consumption as well as other resources of the electronic device 300.

An example of syntax for modularizing a widget for displaying weather conditions is provided below. The example below depicts how the various components or modules of a widget can be decoupled form the main widget so the modules can function independently of the original widget.

The following syntax can be used for indicating the various modules of a widget for conveying weather Syntax:

```
public abstract class ModularWidget extends Widget;
......
public class WeatherWidget extends ModularWidget {
        private ModularWidget weatherSymbolWidget;
        private ModularWidget temperaturWidget;
        ......
        public ModularWidget getWidgetWhenSelected( ) {...}
}
......
public class WeatherSymbolWidget extends ModularWidget {
        public void onCreate( ) {
                // Retrieve following information
                String symbol = getWeatherSymbol( );
                ........
                // Update Widget UI to display all the information;
                display (symbol);
        }
        private String getWeatherSymbol( ) {...}
}
```

In the above example, the syntax provides each module of a widget has its own functionality that is separate from the widget. The syntax of 'public abstract class ModularWidget extends Widget' declares a ModuleWidiget class that extends to the current widget class. For example, this syntax can provide that the new ModularWidget receives the inherent functionalities from the existing widget concept. The syntax 'public class WeatherWidget' indicates that the widget contains various sub-modes that are independent of each other. The syntax of 'public ModularWidget getWidgetWhenSelected' indicates that each sub-mode is accessible by a platform when the user de-modularizes the weather widget. For example, if a certain component or module of the widget is not wanted, then the various resources such as a sensor, received or sent data, or processing capabilities that are associated with the unwanted module can be deactivated and not run. That is, only the resources that are necessary for the modules that remain are used.

In certain embodiments, the electronic device 300 can include a search function. The search function enables a user to search the widget repository 310 or an online widget repository (such as through the PLAYSTORE or the APP STORE) in order to search for a specific widget that includes modules. For example, when creating a new widget, the user may search locally the electronic device or a remote repository for a particular module to be included in the new widget. If the user searches for a particular widget, the user can specific whether the widget is to include modules or whether the widget it to be a single widget without modules. For example if the user searches for the word "food," the user can select whether the food widget is to be modular or not. If the user selects the modular widget search, and the search returns a either (i) a widget that includes modules that are based on food (similar to the widget 440 of FIG. 4A or widget 440A of FIG. 4C, discussed in greater detail) or (ii) a module from a widget that is based on food, (similar to the food module 442 of FIGS. 4C, 5B, and 6B, discussed in greater detail below) the user can move the module to a designated location or to another widget displayed on the display 330.

Figure 4A:
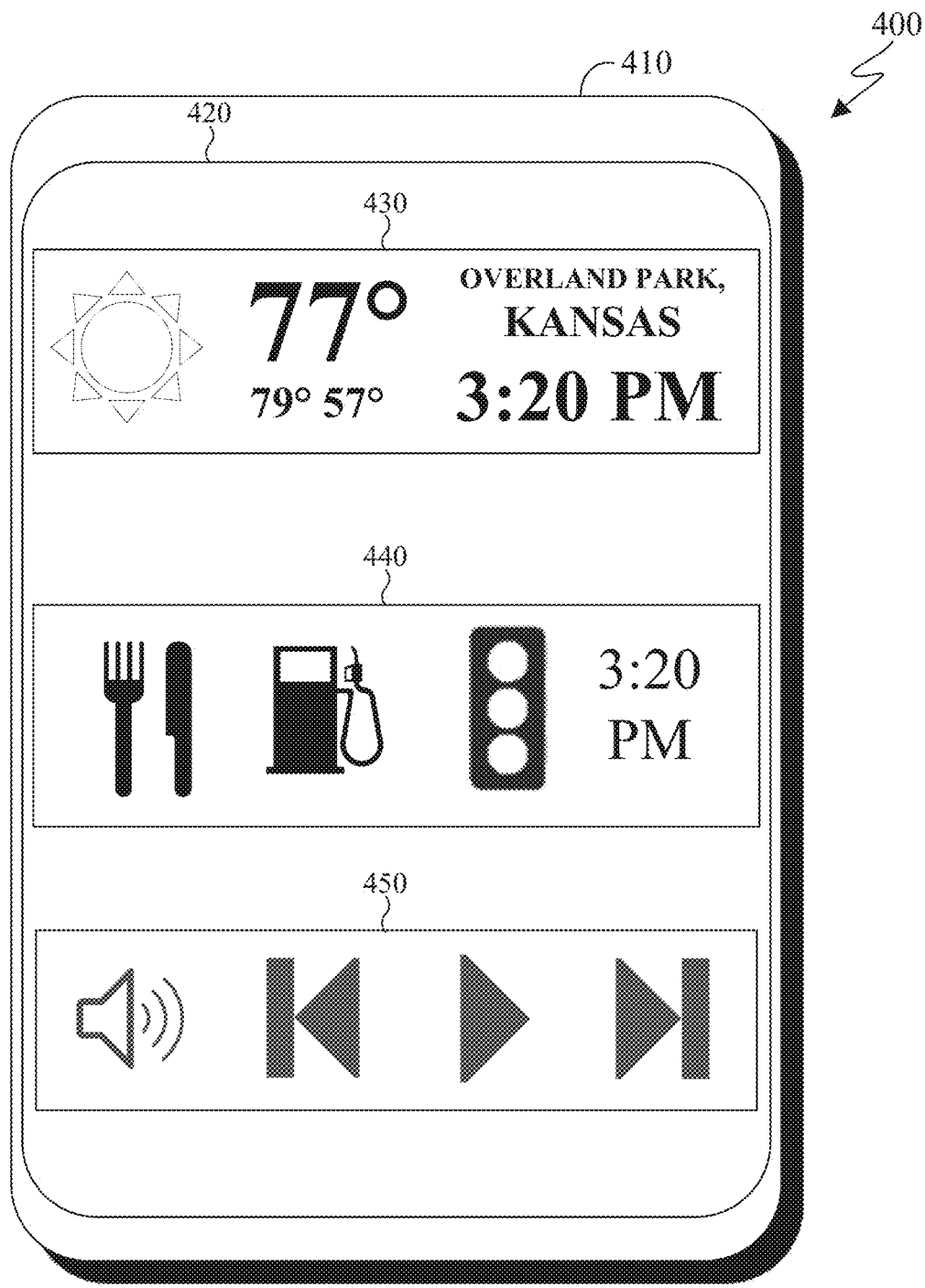
FIG. 4A illustrates an example electronic device displaying widgets in accordance with an embodiment of this disclosure.

FIG. 4A illustrates embodiment 400 of an example electronic device 410 displaying widgets in accordance with an embodiment of this disclosure. The embodiment 400 depicts the electronic device 410 shown in FIG. 4A is for illustration only. Other embodiments can be used without departing from the scope of the present disclosure.

Electronic device 410 illustrates a high-level overview of an embodiment of the present disclosure. Electronic device 410 can be configured similar to any of the one or more client devices 106-114 of FIG. 1, and electronic device 300 of FIG. 3. Electronic device 410 can include internal components similar to that of electronic device 200 of FIG. 2. In certain embodiments, the electronic device 410 is similar to a smart phone (similar to the mobile phone 108 of FIG. 1), a head mounted display, a wearable device, a desktop computer (similar to the desktop computer 106 of FIG. 1), a PDA (similar to the PDA 110 of FIG. 1), a laptop computer (similar to the laptop computer 112 of FIG. 1), a tablet computer (similar to the tablet computer 114 of FIG. 1), and the like. Additional examples of the electronic device 410 include a cellular phone, an image sensing device such as a digital camera with a display, a gaming device that includes a display, a music storage and playback device that includes a display, a household appliance capable of wireless Internet access and web browsing that includes a display, and a portable unit or terminal integrating the functions of the aforementioned items. The electronic device 410 includes a display 420 and three widgets—a weather widget 430, a location widget 440, and an audio playback widget 450.

The display 420 is similar to the display 330 of FIG. 3 and the display 255 of FIG. 2. The display 420 as depicted displays three widgets. It is noted that display 420 can display any number of widgets, icons, applications, images, any type of data, and the like. The three displayed widgets (the weather widget 430, the location widget 440, and the audio playback widget 450) are depicted for illustration purposes only.

The weather widget 430 is a widget that display details of the weather that updates as needed. In certain embodiments, the weather widget 430 displays various metrological weather data that updates at various intervals and does not require a user to open the weather program. The weather widget 430 can be an information widget, as the weather widget 430 provides information to a user. As illustrated, the weather widget displays an image depicting the current ambient condition, the current temperature, a projected high and low temperature for the day, the current location of the user, and the current time.

The location widget 440 is a widget that displays icons to a user, allowing a user to quickly review information about the surroundings of the user. The location widget 440 can provide nearby restaurants, fuel stations, and traffic conditions for the user, as well as indicate the time to the user. In certain embodiments, the restaurant icon can change colors to notify the user if a particular restaurant is near the user, based on the current location of the electronic device. Similarly, the fuel icon can change colors to notify the user if fuel station is near the user with a fuel price that is below a predefined level, based on the current location of the electronic device. In certain embodiments, the traffic condition icon changes colors based on nearby traffic conditions.

The weather widget 430 and the location widget 440 both display the time. When components of different widgets are duplicated, additional resources of the electronic device 410 could be wasted. Therefore embodiments of the present disclosure provide various methods and apparatuses for widget modification are provided. Embodiments of the present disclosure provide additional approaches to interact with an electronic device. Specifically, embodiments of the present disclosure utilize a GUI to limit redundant components of a widget or portions of a widget that the user does not use. For example, embodiments of the present disclosure allow for decoupling the various functions The audio playback widget 450 is a widget that displays control functions for a user to easily and quickly adjust the playback of audio without having to access the playback application or program. The audio playback widget 450 can be a control widget, as the audio playback widget 450 allows a user to control audio output. In certain embodiments, the audio playback widget 450 displays various control functions for a user to control the playback of audio, such as audio volume, play pause, next, previous, random, and the like.

Figure 4B:
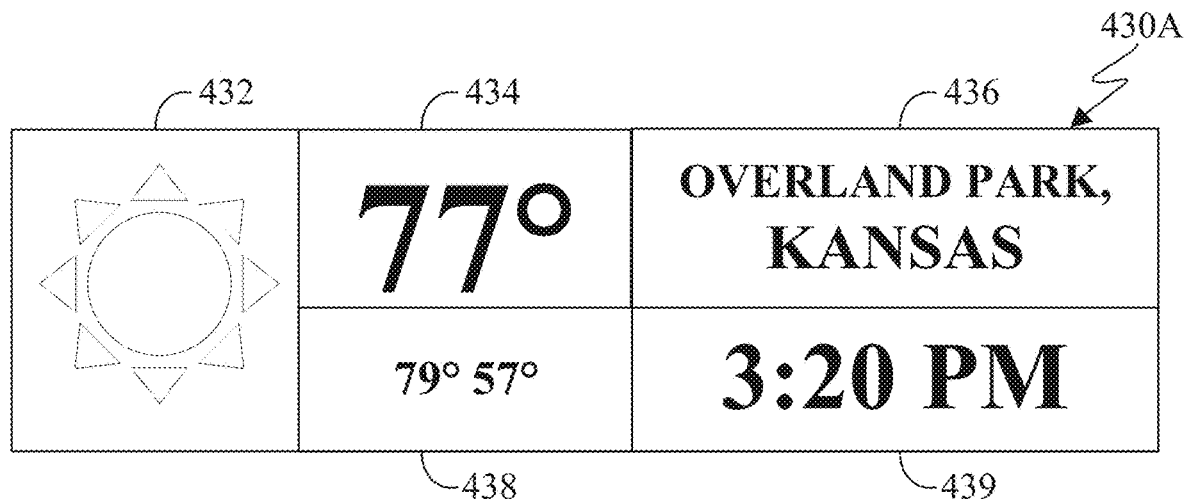
FIGS. 4B-D illustrate widget modules in accordance with an embodiment of this disclosure.
Figure 4C:
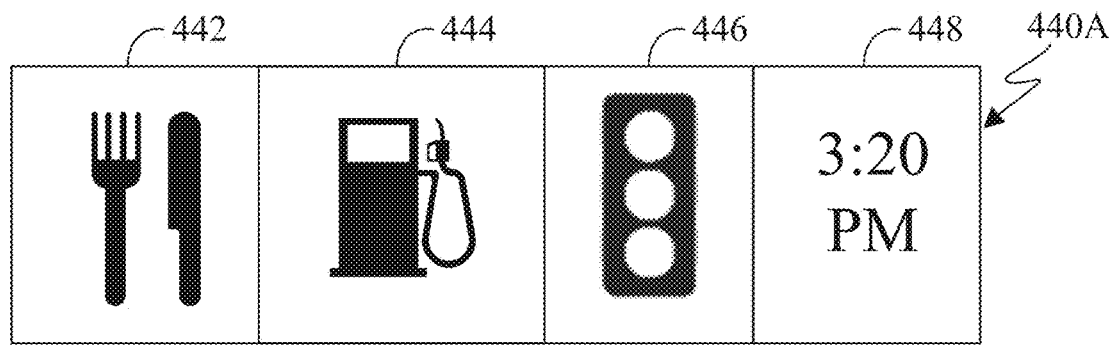
Figure 4D:
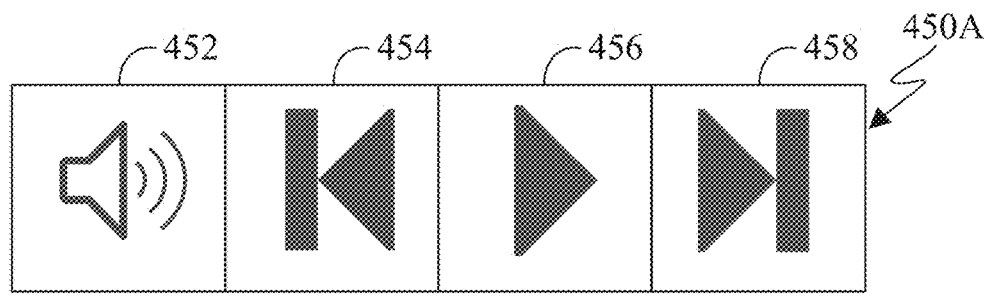

FIGS. 4B-D illustrate widget modules in accordance with an embodiment of this disclosure. The embodiments shown in FIGS. 4B, 4C, and 4D are for illustration only. Other embodiments can be used without departing from the scope of the present disclosure. FIG. 4B illustrates the weather widget 430A, that is similar to the weather widget 430 of FIG. 4A. FIG. 4C illustrates the location widget 440A, that is similar to the location widget 440 of FIG. 4A. FIG. 4D illustrates the audio playback widget 450A, that is similar to the audio playback widget 450 of FIG. 4A. Embodiments of the present disclosure are not limited to the widgets 430A, 440A, and 450A. The widgets 430A, 440A, and 450A are intended as examples and illustrations, for those skilled in the art can appreciate the ability to modify a widget as disclosed herein.

FIGS. 4B-D illustrate the different modules of the widgets 430, 440, and 450 respectively. Some widgets, such as the widgets illustrated in FIGS. 4B-D, are modular widgets. Modular widgets are widgets that are made up of two or more individual modules. For example, the modular widget can look and function as a single widget or can be de-modularized, such that the individual modules that make up the widget can be viewed by the user. For example, weather widget 430 of FIG. A is a modular widget but does not illustrate the individual modules that comprise the widget, whereas the weather widget 430A of FIG. 4B depicts the individual modules of the weather widget 430.

In certain embodiments, electronic device 410 can indicate the various modules of a particular widget in response to a received user input. The input can be a predefined input that indicates that one or more widgets are to be modified by de-modularizing the indicated widget or widgets. An example input can be an input on a touch screen such that the user presses and holds a single location on a widget for a predetermined period of time. In another example, the user can perform another predetermined gesture on or near the widget. The module engine 340 of FIG. 3 can detect or receive the input and perform an output that indicates the indicated widget or widgets are de-modularized and can be modified. FIGS. 4B-4D describes the various modules that are included in the widgets 430, 440, and 450, respectively.

The weather widget 430A of FIG. 4B illustrates the individual modules of the weather widget 430 of FIG. 4A. For example, weather symbol module 432 depicts the current ambient condition. As illustrated the weather symbol module 432 is a symbol of the sun to indicate that it is currently sunny. The weather symbol module 432 can access and utilize a resource at certain intervals to update and display weather symbol based on the current weather conditions. Temperature module 434 displays the current outside temperature. The temperature module 434 can access and utilize a resource at certain intervals to update and display the current temperature. Location module 436 displays the location for which that the temperature is displayed. The location module 436 can access and utilize a resource at certain intervals to update and display the current location that the weather symbol module 432, the temperature module 434, and the temperature range module 438 are based on. Temperature range module 438 indicates the projected high and low temperature for the day. The temperature range module 438 can access and utilize a resource at certain intervals to update and display a projected temperature range. The time module 439 displays the current time. The time module 439 can access and utilize a resource at certain intervals to update and display the current based on the current location as determined from the location module 436.

The location widget 440A of FIG. 4C illustrates the individual modules of the location widget 440 of FIG. 4A. For example, food module 442 is an image of a fork and a knife and can be used to represent nearby restaurants and places where a user can eat. In certain embodiments, the food module 442 is similar to an icon and when activated by a user input brings up a list of nearby restaurants. For example, the resources utilized by the food module 442 are utilized after an input is received. In certain embodiments, the food module 442 can change its appearance based on the location of the user and the time of day. For example, the appearance of the food module 442 can change based on the occurrence of one or more conditions. For instance, if it is approaching a meal time (such as breakfast, lunch, dinner or a combination thereof), when the user is near a certain restaurant, or when the user is near a restaurant that servers a certain type of cuisine the appearance of the food module 442 can changes. The food module 442 can utilize resources to change its appearance. Fuel module 444 displays a fuel pump icon to represent nearby fuel stations. In certain embodiments, the fuel module 444 is similar to an icon and when activated by a user input brings up a list of nearby fuel stations. The resources utilized by the fuel module 444 are utilized after an input is received. In certain embodiments, the fuel module 444 can change its appearance based on the location of the user. For example, the fuel module 444 changes its appearance when the user is within a set distance from a fuel station, or the price for fuel at a fuel station near the user is at below a predefined level. The fuel module 444 can utilize resources to change its appearance. Traffic module 446 displays a traffic light icon to represent current traffic conditions. In certain embodiments, the traffic module 446 is similar to an icon and when activated by a user input displays a map that can include an indication of traffic in the location of the user. The resources utilized by the traffic module 446 are utilized after an input is received. In certain embodiments, the traffic module 446 can change its appearance based on the location of the user without a received input to open the map functions associated with the traffic module 446. For example, traffic module 446 changes its appearance based on nearby traffic conditions of the user. The traffic module 446 can utilize resources to change its appearance. The time module 448 displays the current time. The time module can access a location service to display the correct time based on the current location of the electronic device 410.

The audio playback widget 450A of FIG. 4D illustrates the individual modules of the audio playback widget 450 of FIG. 4A. For example, the speaker module 452 provides access to the volume output setting, allowing a user to increase, decrease, or mute the current volume. Back module 454 allows a user to rewind or replay a previous track. Play module 456 allows a user to start the playing of the audio. The next module 458 allows a user to fast-forward or play the next track.

Figure 5A:
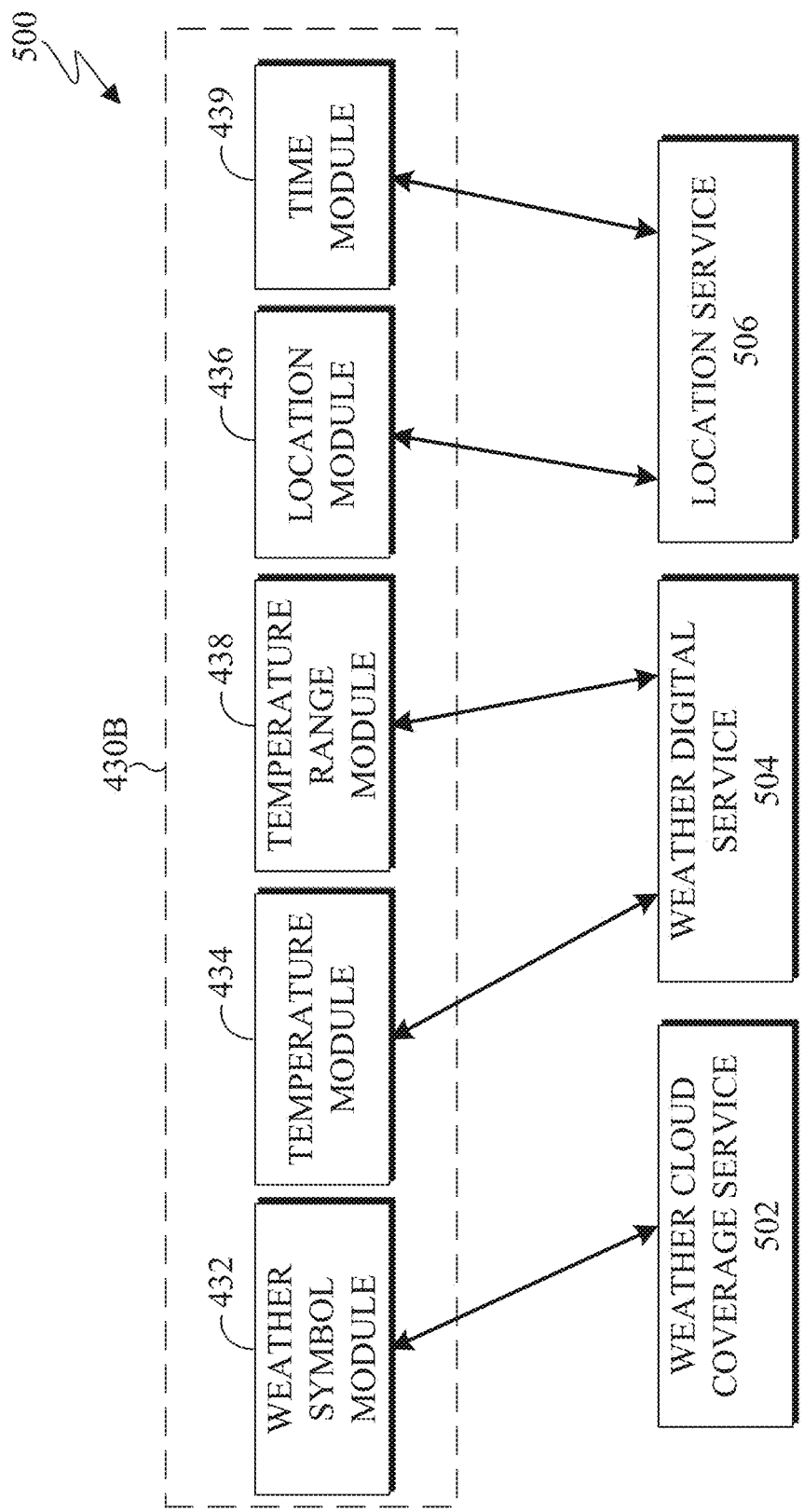
FIGS. 5A-C illustrate example resources the widget modules access in accordance with an embodiment of this disclosure.
Figure 5B:
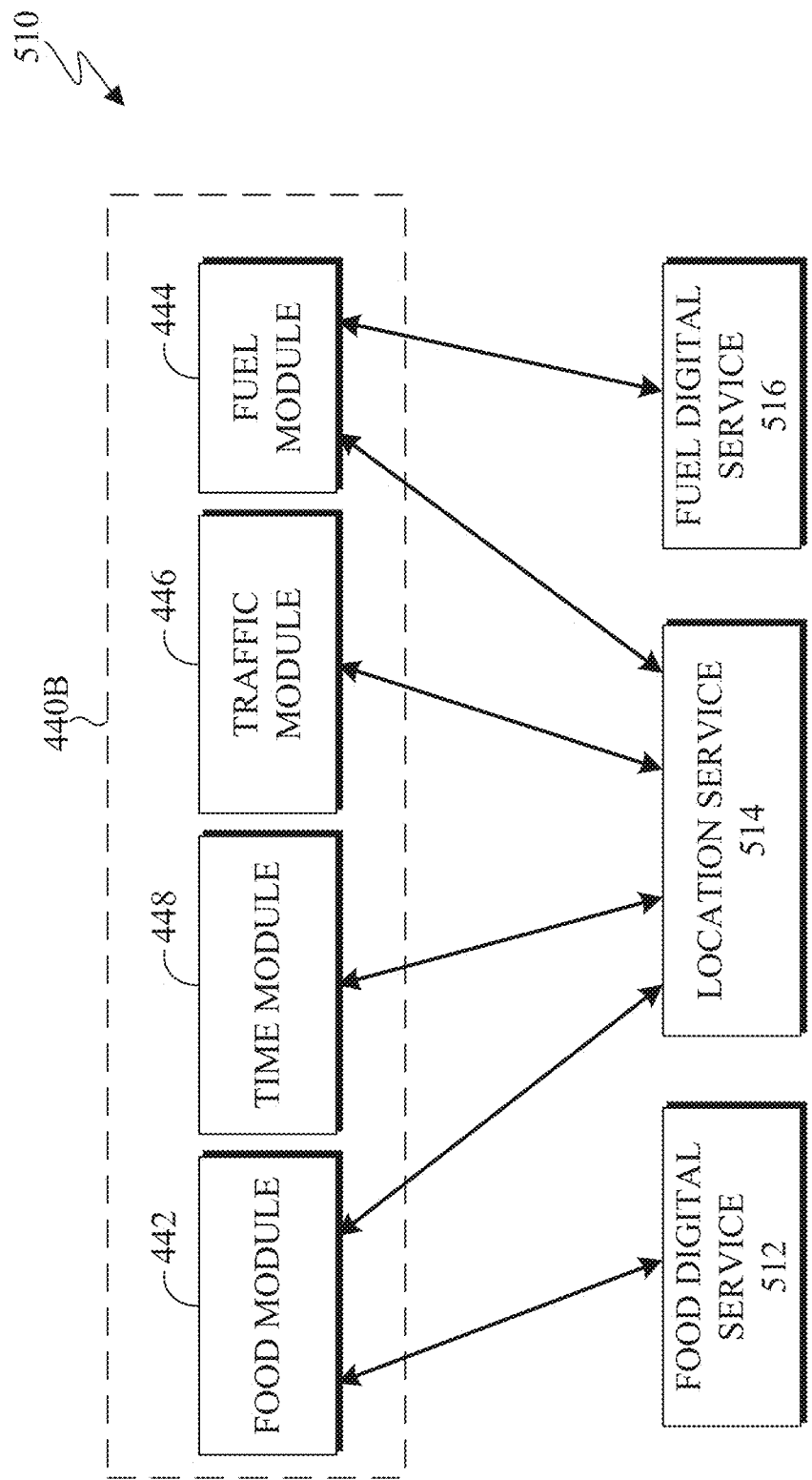
Figure 5C:
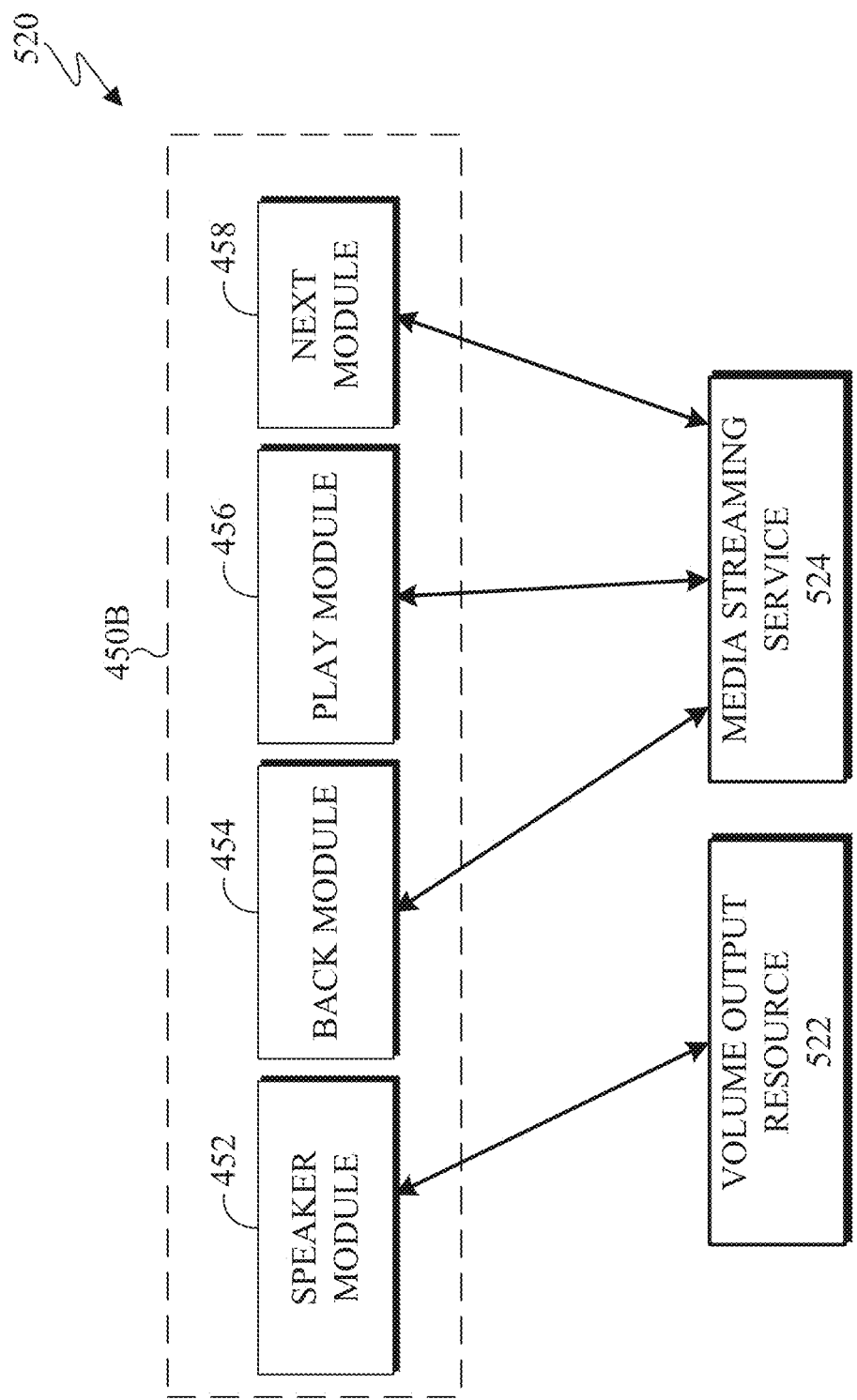

FIGS. 5A-C illustrate example resources the widget modules access in accordance with an embodiment of this disclosure. The embodiments 500, 510, and 520 of FIGS. 5A, 5B, and 5C, respectively, depict the modules of 430B, 440B, and 450B of FIGS. 4B-D and the associated resources of each module. The embodiments 500, 510, and 520 of FIGS. 5A, 5B, and 5C, respectively, are for illustration only. Other embodiments can be used without departing from the scope of the present disclosure.

Each module of widgets as illustrated in 430B, 440B, and 450B of FIGS. 4B-D can be moved or removed based on a user input. Additionally, each module of widgets 430B, 440B, and 450B can utilize one or more resources 320 of the electronic device 300 of FIG. 3 and electronic device 410 of FIG. 4A. The embodiments 500, 510, and 520 of FIGS. 5A, 5B, and 5C, respectively, illustrate example resources used by each module of the widgets 430A, 440A, and 450A of FIG. 4A.

FIG. 5A illustrates embodiment 500 depicting weather widget 430B. The weather widget 430B is similar to the weather widget 430A of FIG. 4B and weather widget 430 of FIG. 4A. In particular, the weather widget 430B illustrates the individual modules of the weather widget 430 of FIG. 4A and the resources that are utilized by the individual modules of the weather widget 430A of FIG. 4B. The embodiment 500 is for illustration only. Other embodiments can be used without departing from the scope of the present disclosure. For example, additional resources or fewer resources can be utilized by each module.

The weather symbol module 432 connects to the weather cloud cover service 502. In certain embodiments, the weather cloud cover service 502 provides the cloud coverage condition. For example, the weather cloud cover service 502 indicates, based on the current location of the electronic device 410, whether it is sunny, partially cloudy, rainy, windy, foggy, and the like. The weather symbol module 432 can access and utilize external resources, such as data received through the weather cloud cover service 502. For example, the weather symbol module 432 can connect to the network and receive data from the weather cloud cover service 502 at certain intervals and thereafter update and display a weather symbol.

The temperature module 434 and the temperature range module 438 can connect to the weather digital service 504 to provide current temperature and temperature ranges. For example, the weather digital service 504 indicates, based on the current location of the electronic device 410 the current temperature to the temperature module 434 and a temperature range to the temperature range module 438. The temperature module 434 and the temperature range module 438 access and utilize external resources, such as received data through the weather digital service 504. For example, the temperature module 434 and the temperature range module 438 can connect to the network and receive data from the weather digital service 504, and update the displayed data accordingly.

The location module 436 and the time module 439 can connect to the location service 506 to provide the actual location of the electronic device 410. The location service 506 can derive the location of the electronic device 410 based on GPS, triangulation of signals for wireless communication, IP address, and the like. The location service 506 can then access and utilize external resources, such as connecting to the network and receive data indicating the current time based on the derived location of the electronic device.

FIG. 5B illustrates embodiment 510 depicting location widget 440B. The location widget 440B is similar to the location widget 440A of FIG. 4C and the location widget 440 of FIG. 4A. In particular, the location widget 440B illustrates the individual modules of the location widget 440 of FIG. 4A and the resources that are utilized by the individual modules of the location widget 440A of FIG. 4C. The embodiment 510 is for illustration only. Other embodiments can be used without departing from the scope of the present disclosure. For example, additional resources or fewer resources can be utilized by each module.

Each module of the location widget 440B (such as the food module 442, the fuel module 444, the traffic module 446, and the time module 448) can connect to the location service 514. The location service 514 is the similar to the location service 506 that is utilized by the weather widget 430B, depicted in FIG. 5A. The location service 514 can derive the location of the electronic device 410 based on GPS, triangulation of signals for wireless communication, IP address, and the like. The location service 514 can then access and utilize external resources, such as connecting to the network and receive data indicating the current time based on the derived location of the electronic device.

The food module 442 can connect to both the food digital service 512 and the location service 514. In certain embodiments, the food digital service 512 provides a listing of nearby restaurants, suggestions for nearby restaurants and the like to the electronic device 410 based on the location information received from the location service 514. The food module 442 can access and utilize external resources, such as data received through the food digital service 512. For example, the food module 442 can connect to the network and receive data from the food digital service 512 and the location service 514 at certain intervals. For instance, the food module 442 can connect to the network and receive data from the food digital service 512 and the location service 514 at predetermined intervals or when an input is received from the user, or a combination thereof.

Similarly, the fuel module 444 can connect to both the location service 514 and the fuel digital service 516. In certain embodiments, the fuel digital service 516 provides a listing of nearby fuel stations, prices of fuel at nearby fuel stations or a combination thereof to the electronic device 410 based on the location information received from the location service 514. The fuel module 444 can access and utilize external resources, such as data received through the fuel digital service 516. For example, the fuel module 444 can connect to the network and receive data from the fuel digital service 516 and the location service 514 at certain intervals. For instance, the fuel module 444 can connect to the network and receive data from the fuel digital service 516 and the location service 514 at predetermined intervals or when an input is received from the user, or a combination thereof.

FIG. 5C illustrates embodiment 520 depicting audio playback widget 450B. The audio playback widget 450B is similar to the audio playback widget 450A of FIG. 4D and the audio playback widget 450 of FIG. 4A. In particular, the audio playback widget 450B illustrates the individual modules of the audio playback widget 450 of FIG. 4A and the resources that are utilized by the individual modules of the audio playback widget 450A of FIG. 4D. The embodiment 520 is for illustration only. Other embodiments can be used without departing from the scope of the present disclosure. For example, additional resources or fewer resources can be utilized by each module.

The speaker module 452 can connect to the volume output resource 522. The volume output resource 522 is an internal resource of the electronic device that controls the volume output for an internal or external speaker associated with the electronic device 410.

The back module 454, the play module 456, and the next module 458 can connect to the media streaming service 524. In certain embodiments, the media streaming service 524 is an internal service that utilizes processing power and memory of the electronic device to play certain media that is stored within the electronic device 410. In certain embodiments, the media stream service 524 is an external service that the back module 454, the play module 546, and the next module 458 connect to. For example, the back module 454, the play module 546, and the next module 458 can connect to a network and receive data from the media stream service 524.

The above discussed resources such as the weather cloud cover service 502, the weather digital service 504, location service 506, the food digital service 512, the location service 514, the fuel digital service 516, the volume output resources 522, and the media streaming service 524, illustrate example resources that individual modules of a widget can access. Each resource as discussed above can access one or more sensors, utilize processing capabilities and utilize memory capabilities of the electronic device 410 as well as receive and send information through a network connection to a remote server. A widget can access one or more of the resources available to the electronic device 410. As the quantity of widgets increases, the more resources are utilized and the performance of the electronic device decreases. Therefore, the ability for a user to select modules of widgets to remove from the display (such as display 420 of FIG. 4A), while maintaining other modules on the display (such as display 420 of FIG. 4A), can preserve resources of the electronic device 410 thereby improve the functioning of the electronic device 410, as the removed modules are disabled or deactivated and prevented from accessing resources. By deactivating or disabling the removed modules from the resources that are generally available to each of the removed modules, prevents the removed module from using resources of the electronic device 410 in order to preserve resources and functionality of the electronic device 410.

Figure 6A:
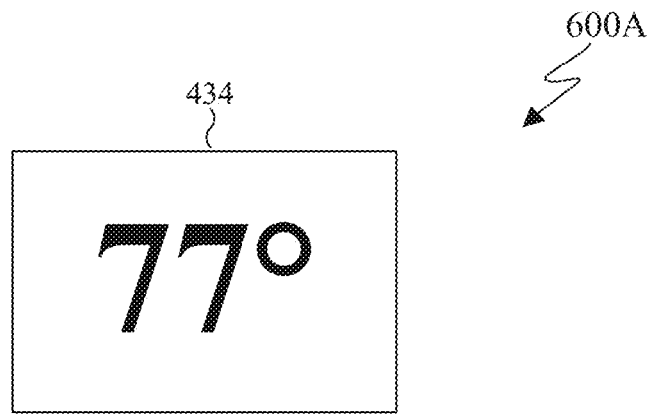
FIGS. 6A-C illustrate example widget modifications accordance with an embodiment of this disclosure.
Figure 6B:
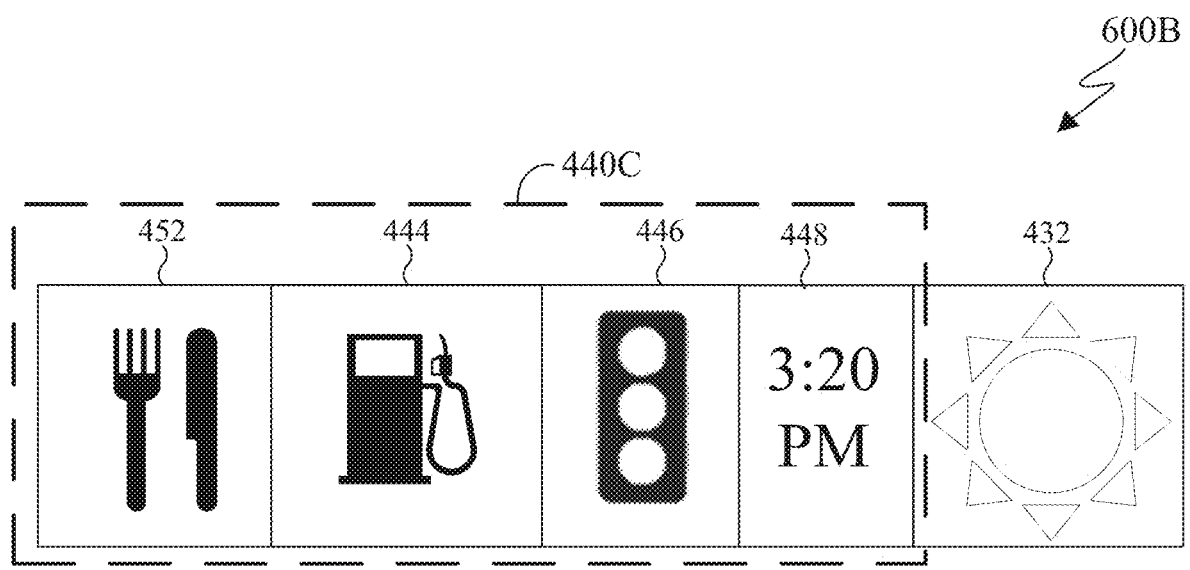
Figure 6C:
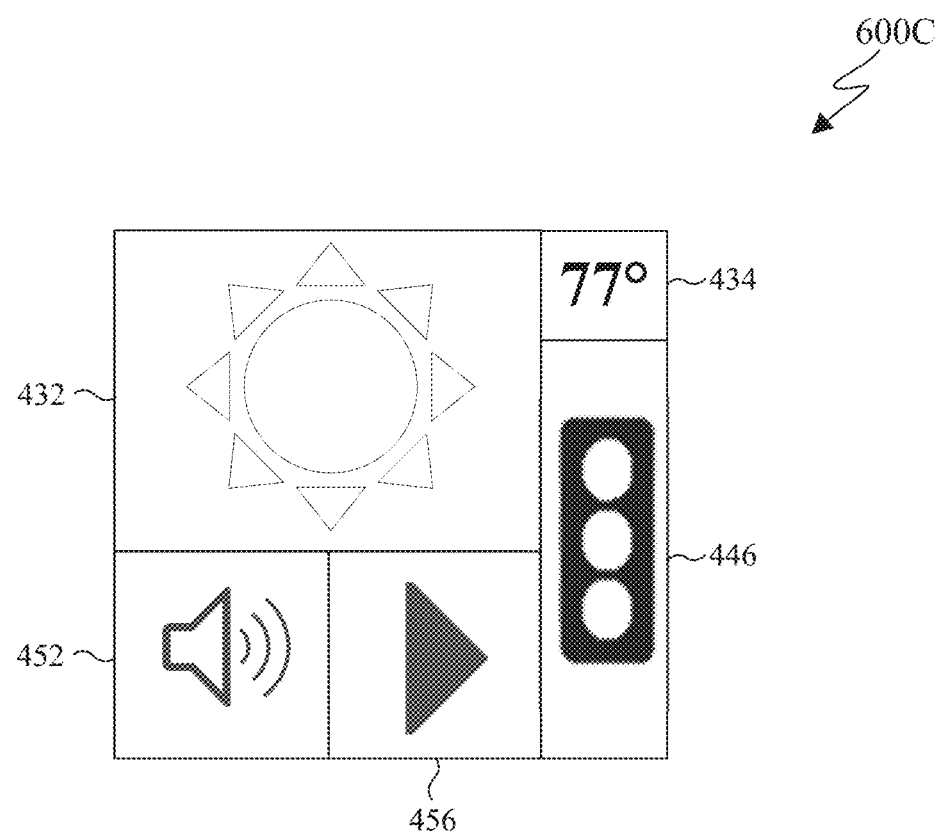

FIGS. 6A-C illustrate example widget modifications accordance with an embodiment of this disclosure. The embodiments shown in FIGS. 6A-C are for illustration only. Other embodiments can be used without departing from the scope of the present disclosure. For example, FIGS. 6A-C depict modified widgets based on de-modularizing widgets and moving, separating and combining the individual modules of the widgets to form the modified widgets. The widgets of FIGS. 6A-C are intended as examples and illustrations, for those skilled in the art can appreciate additional widget modifications as disclosed herein.

After an input is received to de-modularize a widget, the module engine 340 of FIG. 3 indicates the various modules the widget or widgets. In certain embodiments, a user can select one or more modules from the various widgets to move each module to a new location of the display. For example, the moved widget can be moved from its original location within a widget to a new location on the display 420. When the module is placed in a new location on the display 420, the size and the position of the module can be adjusted by additional inputs.

In certain embodiments, a module can be moved within a predetermined proximity to another module. The module engine 340 of FIG. 3 can sense when two or more modules are moved within proximity to each other and stitch the modules together. For example, the distance between each of the modules can be predetermined, automatically determined by the module engine 340 based on the size of the individual modules or set by a user. In certain embodiments, a container is created that allows each module to be placed together and create a modified widget when two or more modules are moved within proximity to each other. The container can adjust the size of each module so that the modules fit together within the container to prevent the individual modules from being shrunk enlarged.

In certain embodiments, a user can also select one or more modules to be removed from a widget. The removed modules are prevented from accessing the resources, in order to improve the functioning of the electronic device, while the modules of the widget that remain on the display maintain access to the resources.

FIG. 6A illustrates modified widget 600A. The modified widget 600A is the temperature module 434. The temperature module 434 is a module of the weather widget 430 of FIG. 4A, and the same module as the temperature module 434 of FIGS. 4B and 5A. In certain embodiments, the temperature module 434 is moved from the weather widget 430 to a new location on the display, such that the remaining modules of the weather widget (the weather symbol module 432, the location module 436, the temperature range module 438, and the time module 439) are located elsewhere on the display. In certain embodiments, the weather symbol module 432, the location module 436, the temperature range module 438, and the time module 439 are removed from the weather widget 430 leaving on the temperature module 434 on the display. If the all the modules except for the temperature module 434 are removed from the weather widget 430, then only the weather digital service 504 resource is maintained and the other resources accessible to the modules of the weather widget 430 are deactivated.

FIG. 6B illustrates modified widget 600B. The modified widget 600B is the location widget 440C and the weather symbol module 432. The location widget 440C is the same widget as the location widget 440 of FIG. 4A, the location widget 440A of FIG. 4C, and the location widget 440B of FIG. 5B. The location widget 400C includes the food module 442, fuel module 444, the traffic module 446, and the time module 448. The weather symbol module 432 is a module of the weather widget 430 of FIG. 4A, and the same module as the weather symbol module 432 of FIGS. 4B and 5A. In certain embodiments, the weather symbol module 432 is moved from the weather widget 430 within proximity of the location widget 440C. For example, when the weather symbol module 432 is within a proximity to the location widget 440C a container is created that holds the location widget 440C and the weather symbol module 432. The container is a component that holds the modules of the location widget 440C and the weather symbol module 432 together. The size and shape of the container is changeable based on the size and shape of the individual modules within the container. The container can also adjust the placement and size of any module that is within the container to customize the location of the modified widget 600B. For instance, the modules can be re-ordered within the container in order to fill a certain area of the display based on an input and indication by the user. In another example, when the weather symbol module 432 is within proximity to the location widget 440C, the weather symbol module 432 is stitched to the location widget 440C. Stitching a module to another module fixes the module in a specific location with respect to the neighboring widgets. When the weather symbol module 432 is connected with the location widget 440C to form the modified widget 600B, the weather symbol module 432 is not dependent on the weather widget 430.

FIG. 6C illustrates modified widget 600C. The modified widget 600C is a compilation of various modules from several widgets. For example, the weather symbol module 432 and the temperature module 434 are the same module as found in the weather widget 430 of FIG. 4A, the weather widget 430A of FIG. 4A, and the weather widget 430B of FIG. 5A. The traffic module 446 is the same module found ion the location widget 440 of FIG. 4A, the location widget 440A of FIG. 4B, and the location widget 440B of FIG. 5B. The speaker module 452 and the play module 456 are the same module as found in the audio playback widget 450 of FIG. 4A, the audio playback widget 450A of FIG. 4D, and the audio playback widget 450B of FIG. 5C.

In certain embodiments, the weather symbol module 432, the temperature module 434, the traffic module 446, the play module 456, and the speaker module 452 are moved from their original corresponding widget and are formed into a modified widget 600C. For example, the weather symbol module 432 and the temperature module 434 are moved from the weather widget 430 and placed in proximity to each other or any other module of modified widget 600C. For instance, either the weather symbol module 432 or the temperature module 434 can be moved to a location on the display that is within a predetermined proximity of each other or within a predetermined proximity of another module that is located in the modified widget 600C. When the modules are located within a predetermined proximity to each other a container is formed that pull the widgets together. The remaining widgets of the weather widget 430 are deactivated from their respective resources. For instance, the location service 506 is fully deactivated or disabled from the weather widget 430 as none of the modules that receive information from the location service 506 are maintained. Similarly, the traffic module 446 is moved from the location widget 440 and placed in proximity any module of modified widget 600C. When the traffic module 446 is located within a predetermined proximity to another widget a container is formed to pull the widgets together. The remaining widgets of the location widget 440 are deactivated from their respective resources. For instance, the traffic module is the only module of the location widget that can access the location service 514, and the food module 442 and the fuel module 444 are disabled and cannot receive information from the food digital service 512 and the fuel digital service 516, respectively. The speaker module 452 and the play module 456 are moved from the audio playback widget 450 and placed in proximity to any module of modified widget 600C. When the speaker module 452 and the play module 456 are located within a predetermined proximity to another widget a container is formed to pull the widgets together. The remaining widgets of the audio playback widget 450 are deactivated from their respective resources. For instance, the back module 454 and the next module 458 are prevented from accessing the media streaming service 524.

The widget 600C can also include a refresh icon, that when activated refreshes all the modules from different original widgets that are included in the new widget. For example, when a refresh instruction is received such as when a user clicks a refresh button or icon, all the sub-modules are refreshed. For instance, the weather symbol module 432 can access the weather cloud coverage service to determine if an updated image is needed. Similarly, the temperature module 434 can access the weather digital service 404 to receive an updated temperature that is to be displayed in the widget 600C. The traffic module 446 can access the location service 514 in response to receiving a refresh command to receive updates of the nearby traffic. The speaker module 452 and the play module 456 of widget 600C can access the volume output resource 522 and the media streaming service 524, respectively in response to receiving a refresh command.

Similarly, the notification bar that displays any new notifications for a user can include a single notification that includes any notifications from the newly created widget 600C. For example, the grouped notification can notify a user if there is traffic in the area based on information received from the traffic module 446, a warning of severe weather from the weather symbol module 432 (of the temperature module 434), and the like. When each module is included in the original widget, each original widget can display its own individual notification in the notification bar. In contrast, by including specific modules into a new widget, the notifications that are displayed in the notification bar are customizable based on the modules selected by the user.

In certain embodiments, when one or more modules are moved to a new location on the display that places the module within proximity to another module, the created container can be expanded to include each additional widget that is brought within proximity to a module that is included in the container. The container can automatically resize and adjust the location of each module within the container so each module fits within the set size of the container. If the container is enlarged or reduced in size, the respective size and location of each module within the container can be changed accordingly. In certain embodiments, a user can manually adjust the size of the container, shape of the container, or both. In certain embodiments, a user can manually adjust the size of a widget within the container, or the location of a widget within the container or both. If the user adjusts the size of the container or one or more widgets within the container the remaining widgets are automatically adjusted to fill in the space within the container.

In certain embodiments, the creation of a container or the ability to stitch two or more modules together allows multiple independent modules to merge and form a single widget. Similarly, a container can be created to hold a single module as well as multiple modules. Each module within the container of the modified widget 600C can run independently of the original widget that the module originated from, as well as independently of the modules within the modified widget 600C. In certain embodiments, the container can adjust or control the relationship and distance between two or more modules.

In certain embodiments, multiple duplicate modules can be added into a new module. For example, when a user moves a module of a widget to create a new widget, the original widget remains whole and displays the moved widget. That is, the moved widget can be displayed on the newly created widget and the original widget. Thereafter the user can move the same module from the original widget to the new widget. In another example, when the module is moved from an original widget to a new widget, a user can indicate a quantity of moved modules to be included in the new widget. By displaying multiple duplicated modules in a new widget allows a user to view and interact with each module individually. For example, if the module is an alarm, the user can set each alarm for a different purpose such as when a user is cooking a meal and needs different alarms for different cooking times or different alarms to wake up in the morning.

In certain embodiments, when a module is removed from a widget and placed at a new location on the display, the remaining modules become non-active and are disabled from utilizing resources of the electronic device. In certain embodiments, one or more modules can be removed from a widget, such that the widget no longer displays the modules that were removed. The removed modules are then disabled from utilizing resources of the electronic device.

Figure 7:
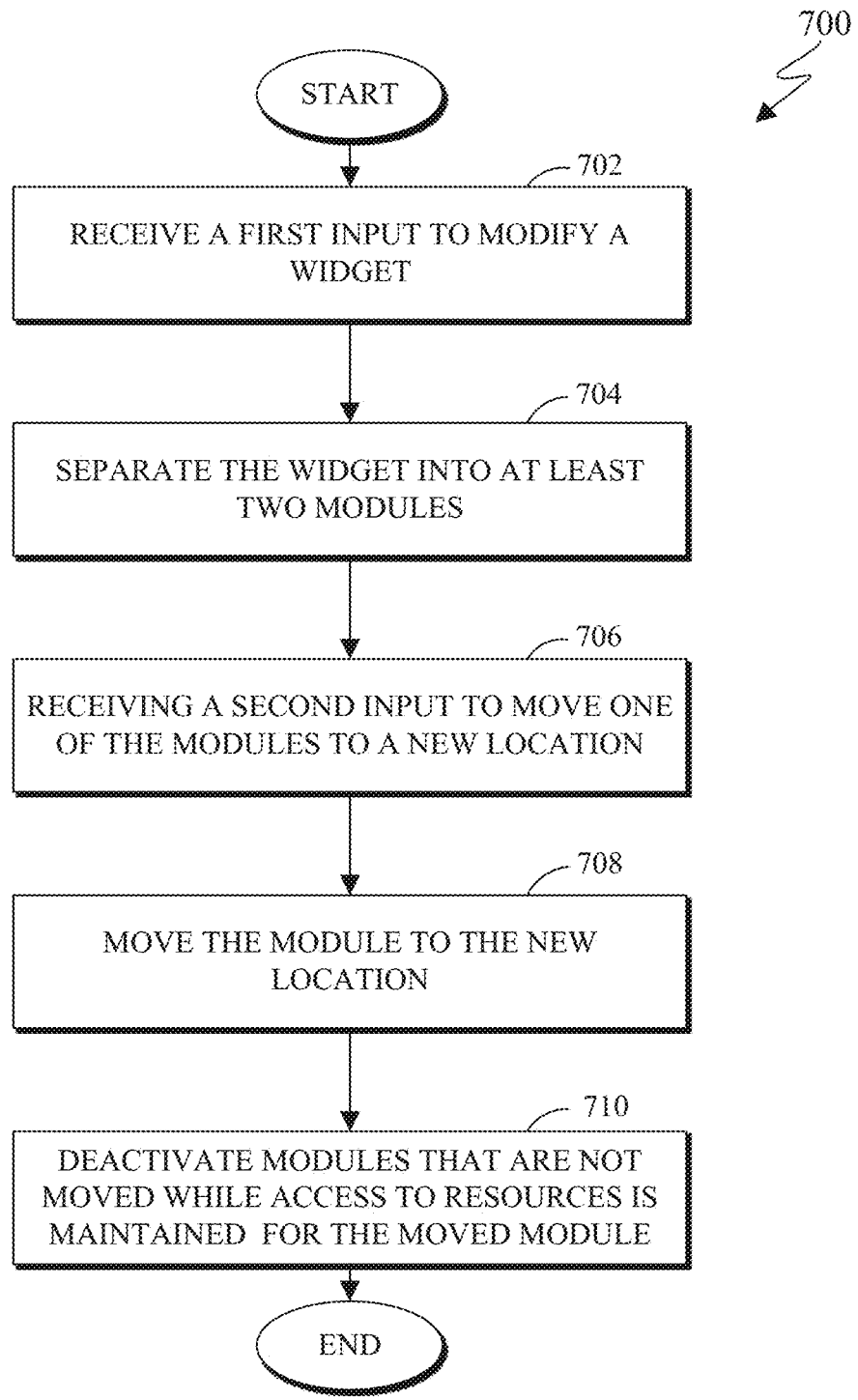
FIG. 7 illustrates a process for widget modification in accordance with an embodiment of this disclosure.

FIG. 7 illustrates a process for widget modification in accordance with an embodiment of this disclosure. FIG. 7 illustrates flowchart 700 for widget modification according to this disclosure. For example, the process depicted in FIG. 7 is described as implemented by the electronic device 200 of FIG. 2, the electronic device 300 of FIG. 3, the electronic device 410 of FIG. 4, or any one of the client devices 106-114 of FIG. 1, and server 104 of FIG. 1.

The process begins with the electronic device, such as electronic device 300 receiving a first input to modify a widget that includes at least two modules, the widget accesses resources of the electronic device (702). The resources of the electronic device include one or more sensors and data communication resources. Data communication resources include data that is transmitted or received to the electronic device 300.

The process then separates the widget into the at least two modules in response to the received first input (704). In certain embodiments, separating the widget into the at least two modules includes displaying, on the display, indicia that the at least two modules are separate. The indicia can be displaying visual changes to the modules, an audible sound emanating from the electronic device 300, a haptic feedback, and the like. Visual changes to the modules can include the modules changing sizes, colors, or moving slightly such as vibrating in place.

The process then receives a second input to move one of the modules to a new location on a display of the electronic device (706). In response to the received second input, the process then moves the one module to the new location on the display (708). In certain embodiments, the widget is a first widget. The process can also receive a third input to move a module of a second widget to the new location and then combine the one module of the first widget and the module of the second widget to form a new widget. In certain embodiments, the process can adjust the size and the position of the one module at the new location in response to one or more inputs. In certain embodiments, the widget is a first widget, and the second input is an input to move the one module of the first widget in proximity to a module of a second widget to combine the modules of the first widget and the second widget. The process can also combine the one module of the first widget and the module of the second widget to form a new widget.

The process then deactivates another of the modules of the widget that is not moved while maintaining access to the resources of the electronic device for the one module (710). Deactivating the other module of the widget includes deactivating any of the one or more sensors and the data communication resources associated with the other module. In certain embodiments, deactivating the other module includes removing the deactivated other module of the widget from the display. Maintaining access to the resources of the electronic device for the one moved module includes maintaining access to any of the one or more sensors and the data communication resources associated with the one module.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the applicants to refer to structures known to those skilled in the relevant art and is not intended to invoke 35 U.S.C. § 112(f).

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An electronic device for widget modification, the electronic device comprising:
   a display configured to display a first widget that is associated with a container and includes at least two components that are visually touching and adjacently arranged within the container; and
   a processor operably coupled to the display, wherein the processor is configured to:
      receive a first input to modify the first widget that includes the at least two components, the first widget having access to resources of the electronic device,
      in response to receiving the first input, separate the at least two components,
      receive a second input to move a first component of the at least two components to a new location on the display of the electronic device,
      in response to receiving the second input, move the first component to the new location on the display, remove the first component from the first widget, automatically adjust a size of the first component at the new location based on one or more sizes of one or more neighboring components, and modify the resources that the first widget has access to based at least in part on whether one or more remaining second components of the at least two components of the first widget utilize at least one of the resources accessible by the first component,
      receive a third input to move a third component of a second widget to a position on the display that is within a predefined distance to the first component at the new location, and
      in response to receiving the third input, move the third component to the position on the display that is within the predefined distance to the first component and generate a new container that combines the first component with the third component to form a third widget, wherein the new container connects the first component with the third component.

2. The electronic device of claim 1, wherein:
   the second input is an input to move the first component of the first widget to a position on the display that is within a predefined distance to a fourth component of an additional widget; and
   the processor is further configured to generate a new container that combines the first component with the additional widget, wherein the new container connects the first component with the fourth component.

3. The electronic device of claim 1, wherein, to separate the at least two components, the processor is further configured to:
   display, on the display, indicia that the at least two components are separate.

4. The electronic device of claim 1, wherein the processor is further configured to:
   determine whether the one or more remaining second components of the first widget that are not moved are still being used; and
   in response to a determination that the one or more remaining second components are not still being used, deactivate the one or more remaining second components while maintaining access to the resources of the electronic device for the first component.

5. The electronic device of claim 4, wherein:
   the resources of the electronic device comprise one or more sensors and data communication resources,
   to deactivate the one or more remaining second components, the processor is configured to deactivate any of the one or more sensors and the data communication resources associated with the one or more remaining second components, and to maintain access to the resources of the electronic device for the first component, the processor is configured to maintain access to any of the one or more sensors and the data communication resources associated with the first component.

6. The electronic device of claim 4, wherein:

to deactivate the one or more remaining second components, the processor is further configured to remove the one or more remaining second components from the display; and the processor is further configured to adjust the size and a position of the first component at the new location in response to one or more inputs.

7. A method for widget modification by an electronic device, the method comprising:

receiving a first input to modify a first widget that is associated with a container and includes at least two components that are visually touching and adjacently arranged within the container, the first widget having access to resources of the electronic device;

in response to receiving the first input, separating the at least two components;

receiving a second input to move a first component of the at least two components to a new location on a display of the electronic device;

in response to receiving the second input, moving the first component to the new location on the display, removing the first component from the first widget, automatically adjusting a size of the first component at the new location based on one or more sizes of one or more neighboring components, and modifying the resources that the first widget has access to based at least in part on whether one or more remaining second components of the at least two components of the first widget utilize at least one of the resources accessible by the first component;

receiving a third input to move a third component of a second widget to a position on the display that is within a predefined distance to the first component at the new location; and in response to receiving the third input, moving the third component to the position on the display that is within the predefined distance to the first component and generating a new container that combines the first component with the third component to form a third widget, wherein the new container connects the first component with the third component.

8. The method of claim 7, wherein:

the second input is an input to move the first component of the first widget to a position on the display that is within a predefined distance to a fourth component of an additional widget; and the method further comprises generating a new container that combines the first component with the additional widget, wherein the new container connects the first component with the fourth component.

9. The method of claim 7, wherein separating the at least two components comprises displaying, on the display, indicia that the at least two components are separate.

10. The method of claim 7, wherein the method further comprises:

determining whether the one or more remaining second components of the first widget that are not moved are still being used; and in response to determining that the one or more remaining second components are not still being used, deactivating the one or more remaining second components while maintaining access to the resources of the electronic device for the first component.

11. The method of claim 10, wherein:

the resources of the electronic device comprise one or more sensors and data communication resources, deactivating the one or more remaining second components comprises deactivating any of the one or more sensors and the data communication resources associated with the one or more remaining second components, and maintaining access to the resources of the electronic device for the first component comprises maintaining access to any of the one or more sensors and the data communication resources associated with the first component.

12. The method of claim 10, wherein:

deactivating the one or more remaining second components comprises removing the one or more remaining second components of the first widget from the display; and the method further comprises adjusting the size and a position of the first component at the new location in response to one or more inputs.

13. A non-transitory computer readable medium embodying a computer program, the computer program comprising computer readable program code that when executed by a processor of an electronic device causes the processor to:

receive a first input to modify a first widget that is associated with a container and includes at least two components that are visually touching and adjacently arranged within the container, the first widget having access to resources of the electronic device;

in response to receiving the first input, separate the at least two components;

receive a second input to move a first component of the at least two components to a new location on a display of the electronic device;

in response to receiving the second input, move the first component to the new location on the display, remove the first component from the first widget, automatically adjust a size of the first component at the new location based on one or more sizes of one or more neighboring components, and modify the resources that the first widget has access to based at least in part on whether one or more remaining second components of the at least two components of the first widget utilize at least one of the resources accessible by the first component;

receive a third input to move a third component of a second widget to a position on the display that is within a predefined distance to the first component at the new location; and in response to receiving the third input, move the third component to the position on the display that is within the predefined distance to the first component and generate a new container that combines the first component with the third component to form a third widget, wherein the new container connects the first component with the third component.

14. The non-transitory computer readable medium of claim 13, wherein:

the second input is an input to move the first component of the first widget to a position on the display that is within a predefined distance to a fourth component of an additional widget; and the computer program further comprises computer readable program code that, when executed by the processor, causes the processor to generate a new container that combines the first component with the additional widget in response to receiving the second input, wherein the new container connects the first component with the fourth component.

15. The non-transitory computer readable medium of claim 13, wherein the computer readable program code that when executed causes the processor to separate the at least two components comprises:
computer readable program code that, when executed by the processor, causes the processor to display, on the display, indicia that the at least two components are separate.

16. The non-transitory computer readable medium of claim 13, wherein the computer program further comprises computer readable program code that, when executed by the processor, causes the processor to:
determine whether the one or more remaining second components of the first widget that are not moved are still being used; and
in response to a determination that the one or more remaining second components are not still being used, deactivate the one or more remaining second components while maintaining access to the resources of the electronic device for the first component.

17. The non-transitory computer readable medium of claim 16, wherein:
the resources of the electronic device comprise one or more sensors and data communication resources,
the computer readable program code that when executed causes the processor to deactivate the one or more remaining second components comprises:
computer readable program code that, when executed by the processor, causes the processor to deactivate any of the one or more sensors and the data communication resources associated with the one or more remaining second components, and
the computer readable program code that when executed causes the processor to maintain access to the resources of the electronic device for the first component comprises:
computer readable program code that, when executed at the processor, causes the processor to maintain access to any of the one or more sensors and the data communication resources associated with the first component.

18. The electronic device of claim 1, wherein the processor is further configured to:
remove the one or more remaining second components from the display; and
deactivate the resources accessible by the one or more remaining second components.

19. The method of claim 7, further comprising:
removing the one or more remaining second components from the display; and
deactivating the resources accessible by the one or more remaining second components.

20. The non-transitory computer readable medium of claim 13, wherein the computer program further comprises computer readable program code that, when executed by the processor, causes the processor to:
remove the one or more remaining second components from the display; and
deactivate the resources accessible by the one or more remaining second components.

* * * * *